United States Patent
Sakamaki et al.

(10) Patent No.: US 8,584,791 B2
(45) Date of Patent: Nov. 19, 2013

(54) HYDRAULIC POWER STEERING APPARATUS

(75) Inventors: Masahiko Sakamaki, Yao (JP); Yasuhiro Tomagou, Yao (JP); Akihiko Shiina, Kashihara (JP); Tetsuya Ozaki, Kitakatsuragi-gun (JP); Ryouichi Kubo, Kashihara (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/273,708

(22) Filed: Oct. 14, 2011

(65) Prior Publication Data

US 2012/0097471 A1 Apr. 26, 2012

(30) Foreign Application Priority Data

Oct. 22, 2010 (JP) ................................. 2010-237426
Mar. 28, 2011 (JP) ................................. 2011-070917

(51) Int. Cl.
*B62D 5/06* (2006.01)

(52) U.S. Cl.
USPC ........... 180/422; 180/441; 180/414; 180/415; 180/417; 180/421

(58) Field of Classification Search
USPC .................. 180/422, 441, 414, 415, 417, 421
See application file for complete search history.

(56) References Cited

U.S. PATENT DOCUMENTS

| | | | | |
|---|---|---|---|---|
| 6,390,228 | B2 * | 5/2002 | Serizawa et al. | 180/403 |
| 7,832,523 | B2 * | 11/2010 | Hung et al. | 180/421 |
| 2008/0296084 | A1 | 12/2008 | Bohm et al. | |
| 2008/0308341 | A1 | 12/2008 | Linkenbach et al. | |

FOREIGN PATENT DOCUMENTS

| | | |
|---|---|---|
| DE | 10 2005 054 277 A1 | 6/2006 |
| DE | 10 2006 005 653 A1 | 8/2007 |
| DE | 10 2008 035 793 A1 | 2/2010 |
| JP | A-2006-123580 | 5/2006 |
| JP | A-2006-290151 | 10/2006 |
| JP | A-2006-306239 | 11/2006 |
| WO | WO 2006/069922 A2 | 7/2006 |

OTHER PUBLICATIONS

Jun. 26, 2013 Search Report issued in European Patent Application No. 11185870.0.

* cited by examiner

*Primary Examiner* — Tashiana Adams
*Assistant Examiner* — Marlon Arce
(74) *Attorney, Agent, or Firm* — Oliff & Berridge, PLC

(57) ABSTRACT

A hydraulic power steering apparatus assists in steering of a vehicle with a hydraulic cylinder. The hydraulic power steering apparatus includes a flow control valve, a steering torque sensor, a steering angle sensor, a vehicle speed sensor, and an ECU. The flow control valve changes the supply/drainage amount of hydraulic fluid for the hydraulic cylinder. The ECU sets a supply/drainage mode for supplying/draining the hydraulic fluid with respect to the hydraulic cylinder based on detection results from the aforementioned sensors and controls the flow control valve in accordance with the supply/drainage mode of the hydraulic fluid.

17 Claims, 18 Drawing Sheets

HYDRAULIC POWER STEERING APPARATUS

INCORPORATION BY REFERENCE

The disclosure of Japanese Patent Applications No. 2010-237426 filed on Oct. 22, 2010 and No. 2011-070917 filed on Mar. 28, 2011 including the specifications, drawings and abstracts is incorporated herein by reference in its entirety.

BACKGROUND OF THE INVENTION

The present invention relates to a hydraulic power steering apparatus for assisting in vehicle steering through a hydraulic cylinder.

For example, Japanese Laid-Open Patent Publication No. 2006-123580 discloses a hydraulic power steering apparatus for assisting in steering of a vehicle through a hydraulic cylinder. This type of power steering apparatus includes a flow control valve for controlling supply/drainage of hydraulic fluid for the hydraulic cylinder. The supply/drainage of the hydraulic fluid is controlled in correspondence with the level of steering torque, which is transmitted from a steering shaft to a rack shaft through a rack and pinion mechanism.

In this flow control valve, the mode of the supply/drainage of the hydraulic fluid for the hydraulic cylinder is determined in correspondence with the amount of torsion of a torsion bar. The torsion amount of the torsion bar corresponds to the relative difference between the phase of a shaft fixed to the steering shaft and the phase of a rotary valve connected to the shaft through the torsion bar.

The above-described conventional hydraulic power steering apparatus assists in steering operation by the driver appropriately. However, assist force, or, in other words, the supply/drainage mode of the hydraulic fluid for the hydraulic cylinder is determined based on the torsion torque of the steering shaft solely. This makes it impossible to change the assist force depending on various types of demands based on the operating state of a vehicle. As a result, there is a demand for a hydraulic power steering apparatus capable of changing the assist force produced by a hydraulic cylinder to meet various types of demands.

SUMMARY OF THE INVENTION

Accordingly, it is an objective of the present invention to provide a hydraulic power steering apparatus capable of controlling assist force of a hydraulic cylinder with improved flexibility.

To achieve the foregoing objective and in accordance with one aspect of the present invention, a hydraulic power steering apparatus is provided that assists in steering of a vehicle with a hydraulic cylinder. The apparatus includes a flow control valve capable of changing a supply/drainage amount of hydraulic fluid for the hydraulic cylinder, a detecting device that detects an operating state of a vehicle, and a control section. The control section sets a supply/drainage mode of the hydraulic fluid for the hydraulic cylinder based on a detection result of the detecting device and that controls the flow control valve in correspondence with the supply/drainage mode.

DETAILED DESCRIPTION OF THE PREFERRED EMBODIMENTS

First Embodiment

A hydraulic power steering apparatus 1 according to a first embodiment of the present invention will now be described with reference to FIGS. 1 to 5B.

Figure 1:
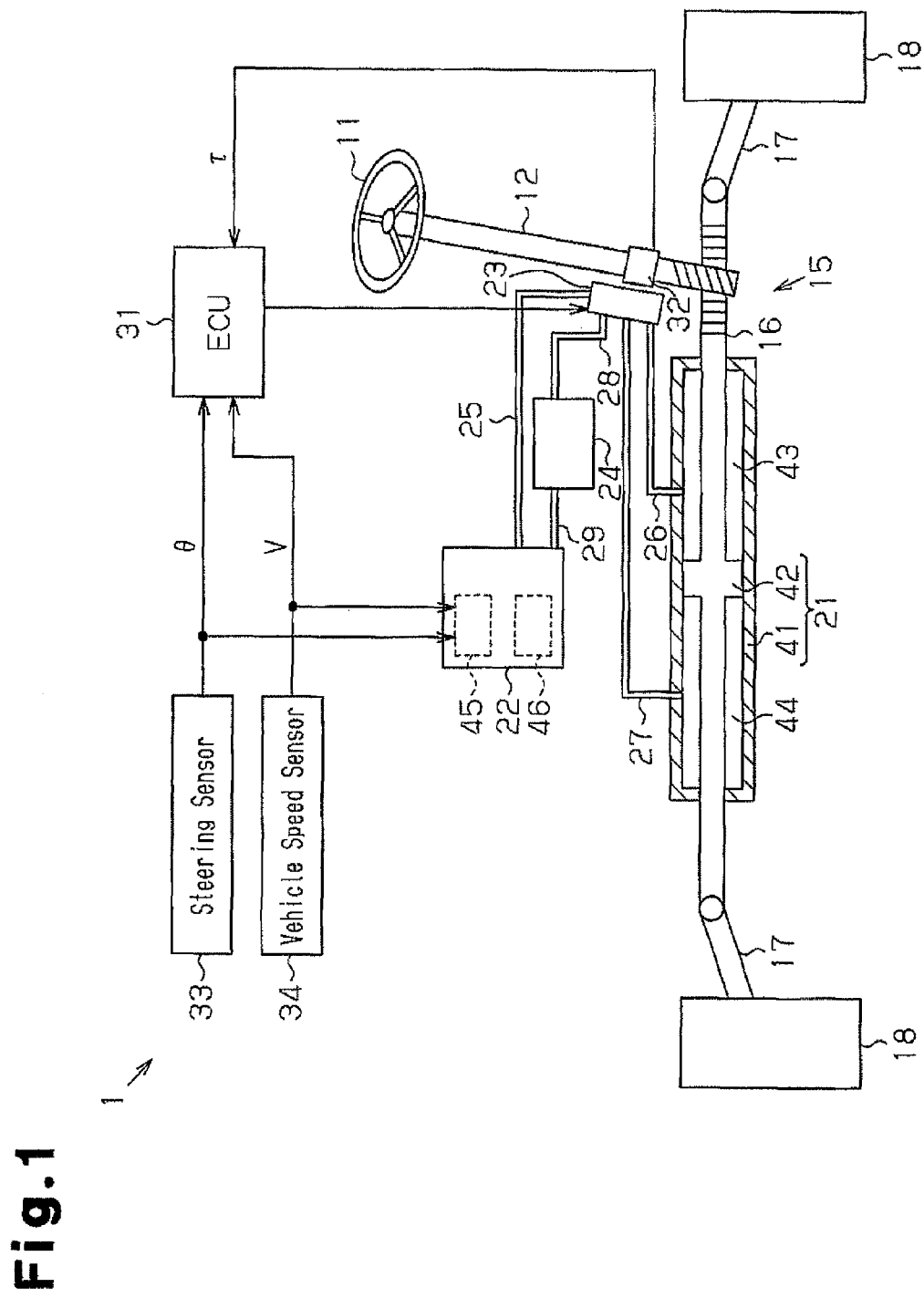
FIG. 1 is a schematic view showing the configuration of a hydraulic power steering apparatus according to a first embodiment of the present invention as a whole.

As shown in FIG. 1, a steering wheel 11 is fixed to a steering shaft 12. A rack and pinion mechanism 15, which is configured by a rack and a pinion, is formed in the steering shaft 12 and a rack shaft 16. Tie rods 17 are connected to both ends of the rack shaft 16. The steering shaft 12 and the rack shaft 16 are connected together through the rack and pinion mechanism 15. When the vehicle is steered, rotation of the steering shaft 12 is converted into reciprocal linear movement of the rack shaft 16 through the rack and pinion mechanism 15. The reciprocal linear movement of the rack shaft 16 is transmitted to a non-illustrated knuckle through the tie rods 17, thus changing the steering angle of steered wheels 18.

The hydraulic power steering apparatus 1 includes a hydraulic cylinder 21, an electric pump 22, a flow control valve 23, and a reservoir tank 24. The hydraulic cylinder 21 is formed integrally with the rack shaft 16. The electric pump 22 supplies hydraulic fluid to the hydraulic cylinder 21. The flow control valve 23 controls the mode of the supply/drainage of the hydraulic fluid for the hydraulic cylinder 21. The reservoir tank 24 retains the hydraulic fluid that has been drained from the hydraulic cylinder 21. The hydraulic cylinder 21, the electric pump 22, the flow control valve 23, and the reservoir tank 24 form a mechanism for assisting in steering.

The hydraulic cylinder 21, the electric pump 22, the flow control valve 23, and the reservoir tank 24 are interconnected through first, second, third, fourth, and fifth fluid passages 25, 26, 27, 28, and 29. The first fluid passage 25 connects the electric pump 22 to the flow control valve 23. The second fluid passage 26 and the third fluid passage 27 connect the flow control valve 23 to the hydraulic cylinder 21. The fourth fluid passage 28 connects the flow control valve 23 to the reservoir tank 24. The fifth fluid passage 29 connects the reservoir tank 24 to the electric pump 22.

The hydraulic cylinder 21 has a housing 41. The rack shaft 16 is passed through the housing 41. A piston 42 is formed in the middle of the rack shaft 16. The piston 42 divides the interior of the housing 41 into a first hydraulic chamber 43 and a second hydraulic chamber 44. The second fluid passage 26 is connected to the first hydraulic chamber 43. The third fluid passage 27 is connected to the second hydraulic chamber 44.

The electric pump 22 includes an electric motor 45 serving as a drive source and a pump 46 having an impeller connected to the output shaft of the electric motor 45. The electric motor 45 is a brushless motor with a three phase coil that rotates only in one direction. The electric pump 22 includes the impeller connected to the output shaft of the electric motor 45. When the impeller is rotated through rotation of the electric motor 45, the hydraulic fluid in the reservoir tank 24 is drawn into the electric pump 22 through the fifth fluid passage 29. The electric pump 22 then sends the hydraulic fluid to the flow control valve 23 through the first fluid passage 25.

The electric pump 22 and the flow control valve 23 are controlled by an electronic control unit (hereinafter, an "ECU 31") serving as a control section. A torque sensor 32, a steering angle sensor 33, and a vehicle speed sensor 34, all of which serve as detecting means, are electrically connected to the ECU 31. The ECU 31 detects the steering torque $\tau$, the steering angle $\theta$, and the vehicle speed V, which represent the operating state of the vehicle, based on detection signals from the aforementioned sensors.

Figure 2:
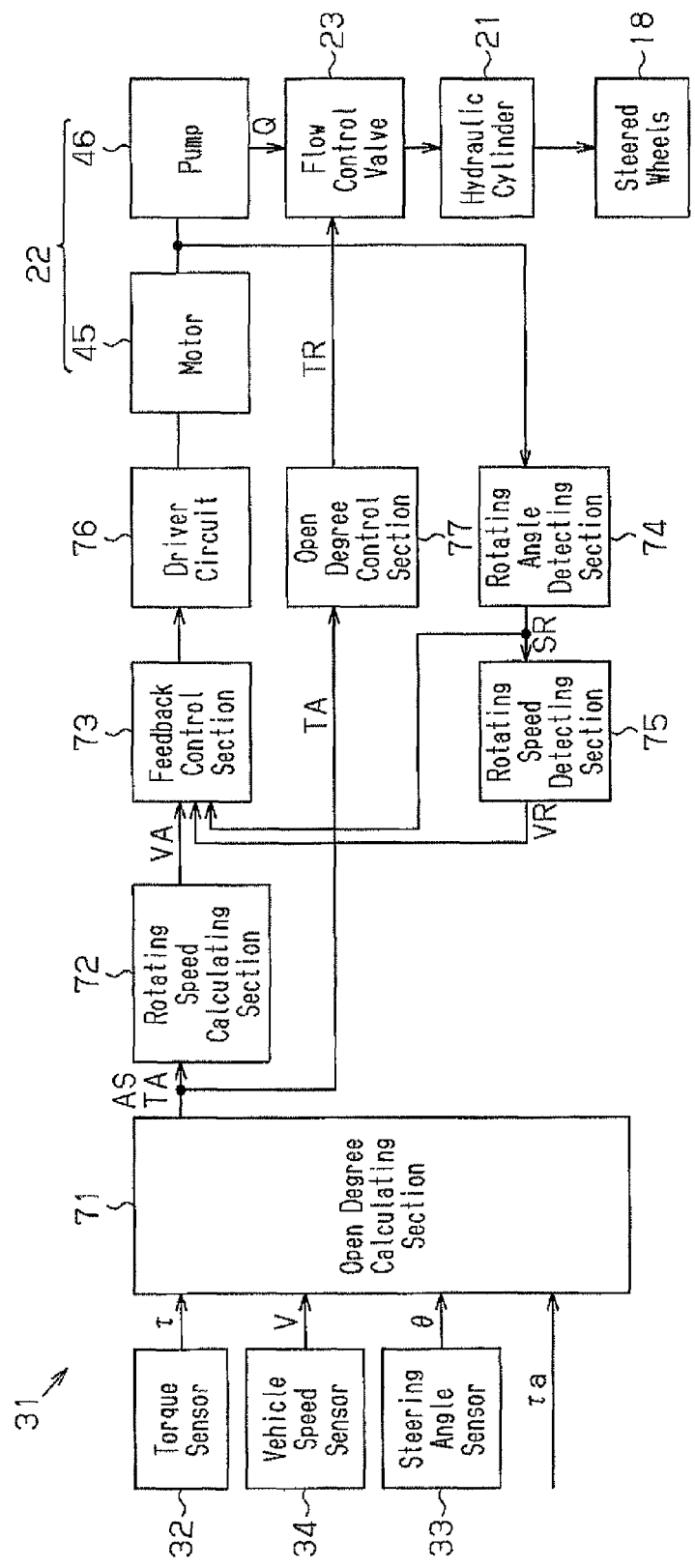
FIG. 2 is a block diagram representing control in a hydraulic power steering apparatus.

Control in the hydraulic power steering apparatus 1 will hereafter be described with reference to FIG. 2.

The ECU 31 has an open degree calculating section 71. The open degree calculating section 71 calculates a target assist force AS based on the steering torque $\tau$, the steering angle $\theta$, and the vehicle speed V provided by the torque sensor 32, the steering angle sensor 33, and the vehicle speed sensor 34, respectively, and obtains an open degree command value TA for the flow control valve 23 based on the target assist force AS. Using the open degree command value TA provided by the open degree calculating section 71, the ECU 31 controls the flow rate Q of the electric pump 22 and the supply/drainage mode of the hydraulic fluid for the hydraulic cylinder 21, which is performed by the flow control valve 23.

Specifically, the open degree command value TA is input from the open degree calculating section 71 to a rotating speed calculating section 72. The rotating speed calculating section 72 calculates a rotating speed command value VA for the electric motor 45 based on the open degree command value TA and the target assist force AS. The rotating speed command value VA is sent from the rotating speed calculating section 72 to a feedback control section 73. The feedback control section 73 receives an actual rotating angle SR of a motor 45 from a rotating angle detecting section 74, which detects the actual rotating angle SR. The feedback control section 73 also receives an actual rotating speed VR from a rotating speed detecting section 75. The rotating speed detecting section 75 calculates the actual rotating speed VR by differentiating the actual rotating angle SR, which is detected by the rotating angle detecting section 74. The feedback control section 73 performs rotating speed feedback control based on the rotating speed command value VA, the actual rotating angle SR, and the actual rotating speed VR and outputs a generated motor control signal to a driver circuit 76. In this manner, the flow rate Q of the electric pump 22 is controlled.

The open degree command value TA is input to not only the rotating speed calculating section 72 but also an open degree control section 77. The open degree control section 77 controls the supply/drainage mode of the hydraulic fluid for the hydraulic cylinder 21 performed by the flow control valve 23 based on the open degree command value TA. Specifically, the open degree control section 77 switches supply of the hydraulic fluid between the first hydraulic chamber 43 and the second hydraulic chamber 44 with reference to the open degree command value TA. Also, the open degree control section 77 controls an actual open degree TR of the flow control valve 23 such that the actual open degree TR becomes equal to the open degree command value TA. As a result, a predetermined amount of hydraulic fluid is supplied to the selected hydraulic chamber.

The hydraulic power steering apparatus 1 of the first embodiment may carry out parking assist control as traveling assist control for a vehicle. Through the parking assist control, a vehicle is parked at a parking position set in advance through automatic steering based on information provided by a monitor mounted in the vehicle. In the parking assist control, the relationship between a target parking position set in advance by a vehicle ECU and the current vehicle position included in the monitor information is determined. Then, the vehicle ECU calculates a torque command value $\tau a$, which is needed for parking the vehicle, in correspondence with the determined position relationship. After the torque command value $\tau a$ is input to the open degree calculating section 71, the open degree calculating section 71 calculates such an open degree command value TA that the current vehicle position coincides with the target parking position based on the torque command value $\tau a$, the vehicle speed V, and the steering torque $\tau$. Then, depending on the open degree command value TA provided by the open degree calculating section 71, the open degree control section 77 controls the flow rate Q of the electric pump 22, switching to the hydraulic chamber 43 (44)

to receive the hydraulic fluid, and the amount of the hydraulic fluid supplied to the hydraulic chamber 43 (44), as has been described.

The configuration of the flow control valve 23 will hereafter be described with reference to FIGS. 3 to 5.

Figure 3:
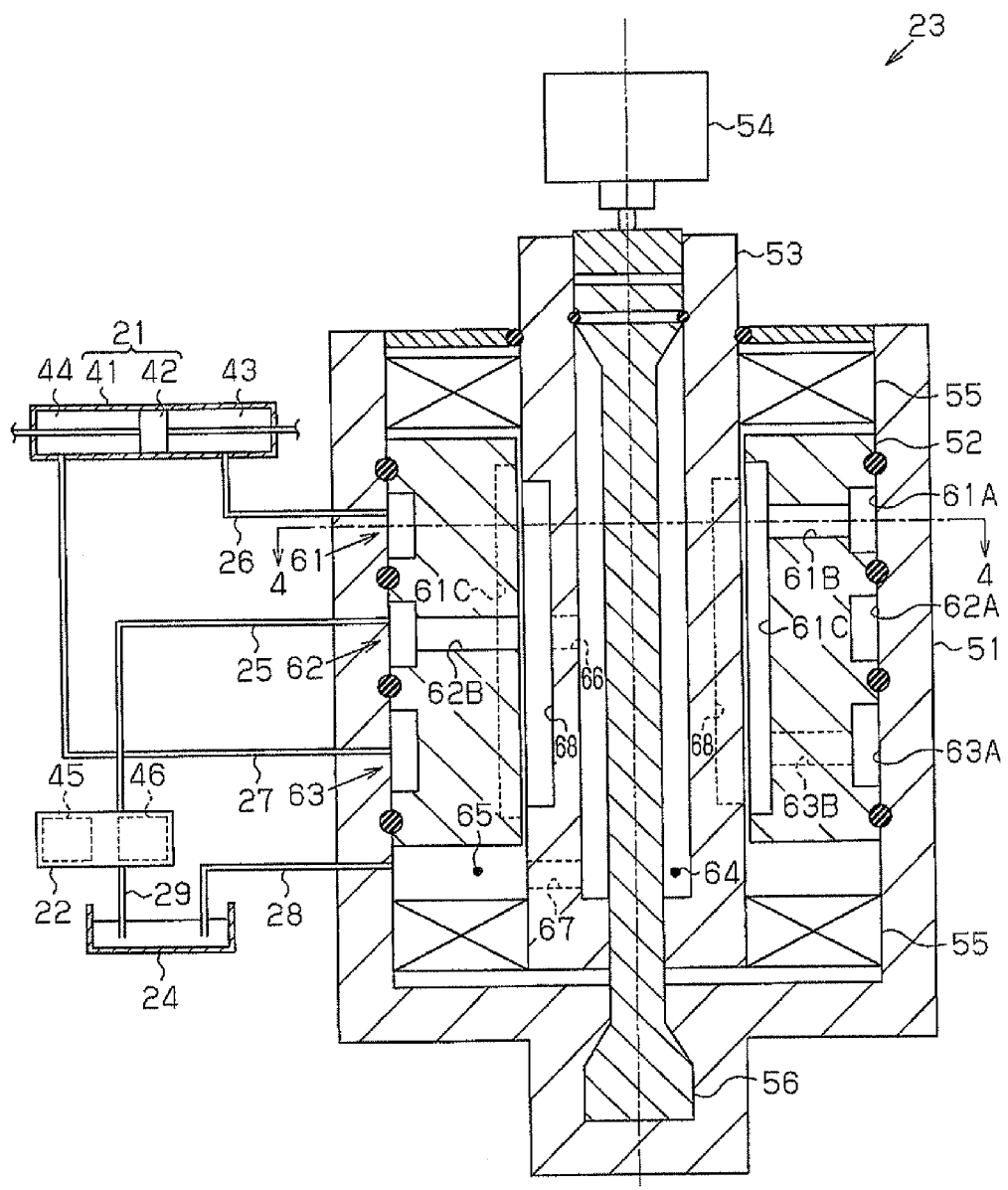
FIG. 3 is a longitudinal cross-sectional view showing a flow control valve.

With reference to FIG. 3, the flow control valve 23 has a housing 51 having a lidded cylindrical shape. An annular regulation valve 52 for regulating supply of hydraulic fluid to the hydraulic cylinder 21 is fixedly received in the housing 51. A valve portion 53 having a hollow cylindrical shape is passed through the regulation valve 52. The motor 54 is attached to an axial end of the valve portion 53. The valve portion 53 is rotated by the motor 54. The valve portion 53 is rotatably supported by bearing members 55, which are arranged at the two axial ends of the housing 51.

A torsion bar 56 is arranged in the flow control valve 23. The torsion bar 56 connects the bottom of the housing 51 to the end of the valve portion 53 to which the motor 54 is attached. When the valve portion 53 rotates about its axis, the torsion bar 56 is twisted about the axis of the valve portion 53.

In the regulation valve 52, first ports 61, supply ports 62, and second ports 63 are axially arranged in this order from the side corresponding to the motor 54. Each of the first ports 61 communicates with the first hydraulic chamber 43 through the second fluid passage 26. Each of the supply ports 62 communicates with the electric pump 22 through the first fluid passage 25. Each of the second ports 63 communicates with the second hydraulic chamber 44 through the third fluid passage 27.

Each first port 61 is configured by a first annular groove 61A, a first longitudinal axial groove 61C, and a first communication hole 61B. The first annular groove 61A is formed in the outer peripheral surface of the regulation valve 52. The first longitudinal axial groove 61C is formed in the inner peripheral surface of the regulation valve 52, extending in the axial direction. The first communication hole 61B extends in a radial direction to allow communication between the first annular groove 61A and the first longitudinal axial groove 61C. Each second port 63 is configured by a second annular groove 63A, a second longitudinal axial groove 63C, and a second communication hole 63B. The second annular groove 63A is formed in the outer peripheral surface of the regulation valve 52. The second longitudinal axial groove 63C is formed in the inner peripheral surface of the regulation valve 52, extending in the axial direction. The second communication hole 63B extends in a radial direction to allow communication between the second annular groove 63A and the second longitudinal axial groove 63C.

Each supply port 62 is configured by an annular groove 62A and a supply communication hole 62B. The annular groove 62A is formed in the outer peripheral surface of the regulation valve 52. The supply communication hole 62B connects the annular groove 62A to the inner peripheral surface of the regulation valve 52. The first fluid passage 25 communicates with the annular groove 62A of the supply port 62. The second fluid passage 26 communicates with the first annular groove 61A of the first port 61. The third fluid passage 27 communicates with the second annular groove 63A of the second port 63. The communication holes 61B, 62B, 63B and the longitudinal axial grooves 61C, 63C are spaced apart at regular angular intervals in a circumferential direction of the regulation valve 52. The flow control valve 23 has a drainage port 65, which is formed in the space between the regulation valve 52 and the corresponding one of the bearing members 55. The drainage port 65 communicates with the reservoir tank 24 through the fourth fluid passage 28.

The valve portion 53 has a hollow structure. Eight recesses 68 are formed in the outer peripheral surface of the valve portion 53. The recesses 68 are spaced apart at regular angular intervals in a circumferential direction of the valve portion 53. A plurality of inlet communication holes 66, which extend from the outer peripheral surface of the valve portion 53 toward the axis of the valve portion 53, are formed in the valve portion 53. Out of the eight recesses 68, the first, third, fifth and seventh ones of the recesses 68 as counted along the circumferential direction communicate with an inner space 64 of the valve portion 53 through the corresponding inlet communication holes 66. The valve portion 53 has a second communication passage 67 at the position corresponding to the drainage port 65. The second communication passage 67 ensures communication between the drainage port 65 and the inner space 64 of the valve portion 53.

In the flow control valve 23, by rotating the valve portion 53 through the motor 54, the communication modes of the ports 61, 62, 63, 65 are switched among three modes as will be described. Specifically, in the first mode for setting the valve portion 53 at the first supply position, the supply port 62 communicates with the first port 61 (the first hydraulic chamber 43) and the drainage port 65 communicates with the second port 63 (the second hydraulic chamber 44). In the second mode for setting the valve portion 53 at the second supply position, the supply port 62 communicates with the second port 63 (the second hydraulic chamber 44) and the drainage port 65 communicates with the first port 61 (the first hydraulic chamber 43). In the neutral mode for setting the valve portion 53 at the neutral rotating position, the supply ports 62 and the drainage port 65 communicate with the first ports 61 and the second ports 63 through the gap between the regulation valve 52 and the valve portion 53.

The three modes are switched based on the relative difference between the phase of the valve portion 53 and the phase of the regulation valve 52 in the circumferential direction. The relative phase difference is detected based on change in the torque acting on the motor 54 in correspondence with the shape restoration force of the torsion bar 56 against torsion, which is the value of an electric current of the motor 54. Specifically, the actual electric current value of the motor 54 corresponding to the current position of the valve portion 53 is detected. Further, the electric current value of the motor 54 is controlled such that the actual electric current value becomes equal to the target electric current value for the motor 54 corresponding to the target position.

Also, by rotating the valve portion 53 through the motor 54, the flow control valve 23 adjusts the amount of the hydraulic fluid supplied to the second fluid passage 26 (the first hydraulic chamber 43) and the amount of the hydraulic fluid drained from the third fluid passage 27 (the second hydraulic chamber 44) in the first mode. Further, the flow control valve 23 adjusts the amount of the hydraulic fluid supplied to the second hydraulic chamber 44 and the amount of the hydraulic fluid drained from the first hydraulic chamber 43 in the second mode.

In this case, the amount of the hydraulic fluid supplied to the ports is controlled by regulating the open degree of the first port 61 in the first mode or the open degree of the second port 63 in the second mode based on the open degree command value TA. In other words, the amount of electric current to the motor 54 is controlled to achieve the demanded open degree of the first port 61 or the demanded open degree of the second port 63. This adjusts the supply/drainage amount of the hydraulic fluid for the ports 61, 63, or, in other words, the supply/drainage amount of the hydraulic fluid for the hydraulic chambers 43, 44 of the hydraulic cylinder 21.

Figure 4:
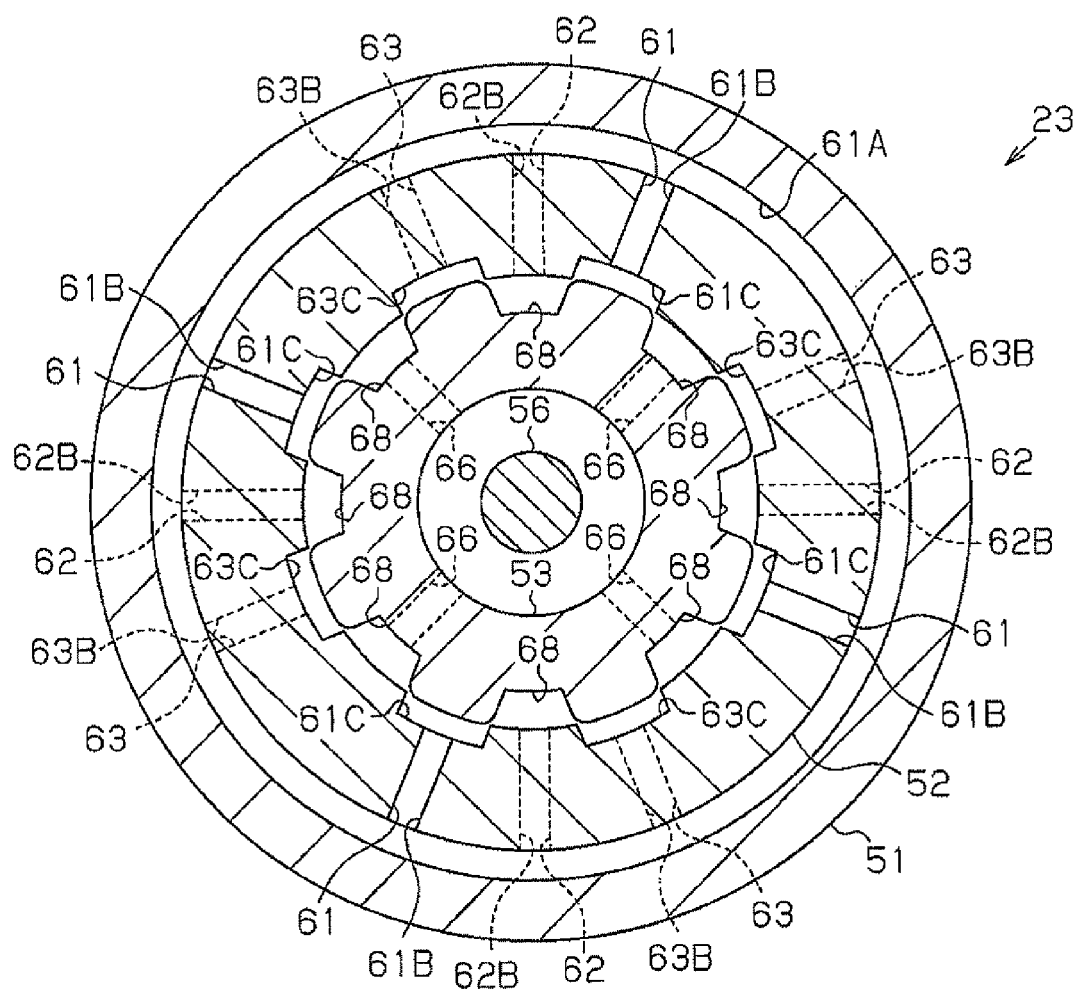
FIG. 4 is a cross-sectional view taken along line 4-4 of FIG. 3 at the time when a vehicle proceeds linearly.

After electric current supply to the motor 54 is suspended in the first mode or the second mode, the shape restoration force of the torsion bar 56 maintains the valve portion 53 in the neutral mode, as illustrated in FIG. 4.

The path of the hydraulic fluid in the flow control valve 23 will hereafter be described with reference to FIGS. 4 to 5B.

When steering is not performed, such as when the vehicle proceeds linearly or is stopped, the recesses 68 of the valve portion 53 are arranged to avoid overlapping in the radial direction with the first longitudinal axial grooves 61C of the first port 61 and the second longitudinal axial grooves 63C of the second port 63, as illustrated in FIG. 4. In other words, the flow control valve 23 is maintained in the neutral mode. In this state, the electric pump 22 is stopped.

Figure 5A:
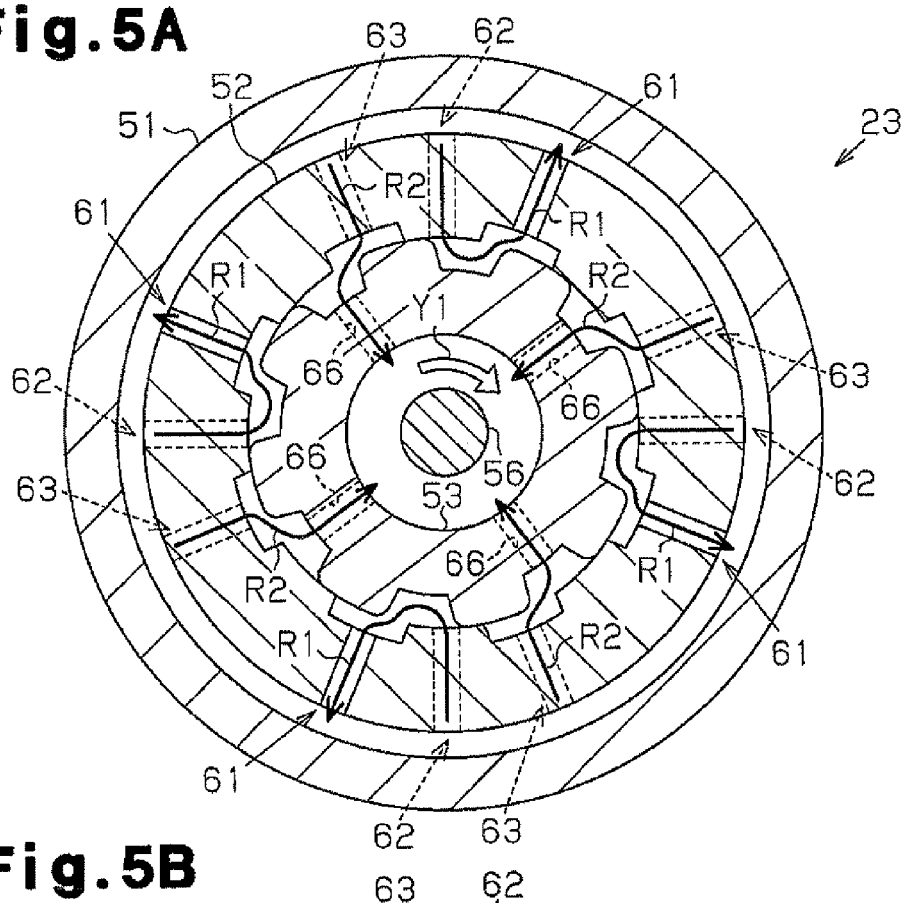
FIG. 5A is a cross-sectional view taken along line 4-4 of FIG. 3 at the time when the vehicle turns leftward.

When the vehicle is steered to turn leftward, the valve portion 53 is rotated in the direction indicated by arrow Y1, as shown in FIG. 5A, and switched to the first mode in which each supply port 62 and the corresponding first port 61 are held in a communicating state. In this state, as indicated by each arrow R1, the hydraulic fluid that has been sent from the supply port 62 is supplied to the first hydraulic chamber 43 (see FIG. 3) through the first port 61. On the other hand, as indicated by each arrow R2, the hydraulic fluid that has been sent from the second hydraulic chamber 44 (see FIG. 3) to the flow control valve 23 is drained from the second port 63 to the reservoir tank 24 via the drainage port 65 and the fourth fluid passage 28.

Figure 5B:
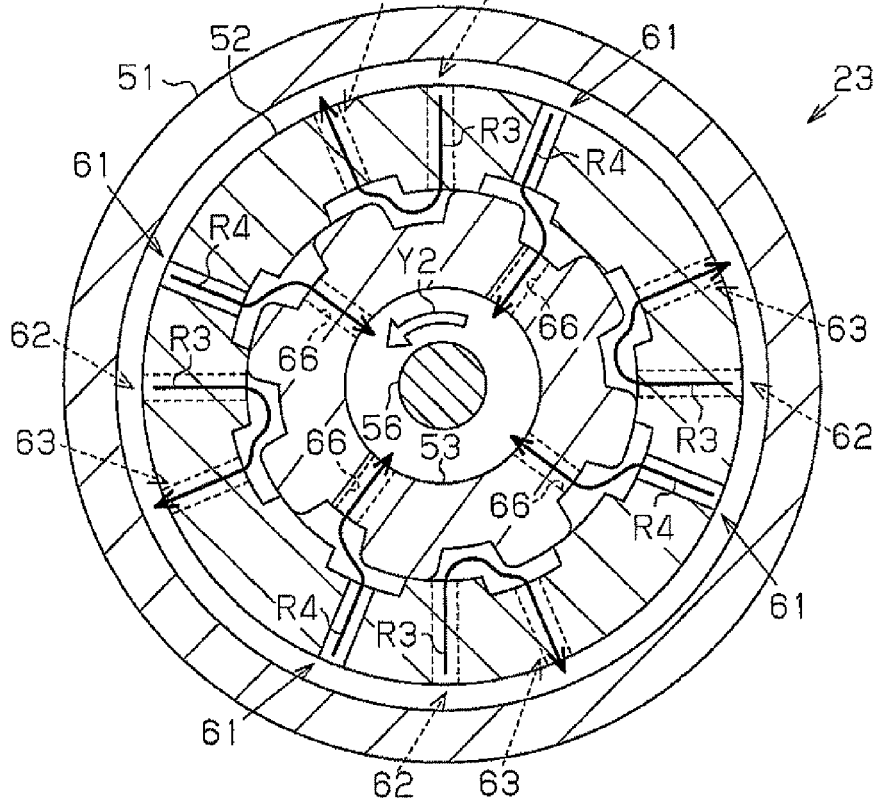
FIG. 5B is a cross-sectional view taken along line 4-4 of FIG. 3 at the time when the vehicle turns rightward.

When the vehicle is steered to turn rightward, the valve portion 53 is rotated in the direction indicated by arrow Y2, as shown in FIG. 5B, and switched to the second mode in which each supply port 62 communicates with the corresponding second port 63. In this state, as indicated by each arrow R3, the hydraulic fluid that has been sent from the supply port 62 is supplied to the second hydraulic chamber 44 through the second port 63. On the other hand, as indicated by each arrow R4, the hydraulic fluid that has been sent from the first hydraulic chamber 43 to the flow control valve 23 is drained from the first port 61 to the reservoir tank 24 via the drainage port 65 and the fourth fluid passage 28.

The first embodiment has the advantages described below.

(1) In the conventional hydraulic power steering apparatus, the supply/drainage mode of the hydraulic fluid for the hydraulic cylinder is determined based on the driver's manipulation of the steering wheel solely. However, in the first embodiment, the ECU 31 sets the open degree command value TA, which represents the supply/drainage mode of the hydraulic fluid for the hydraulic cylinder 21, and controls the flow control valve 23 using the open degree command value TA. In this manner, the supply/drainage mode of the hydraulic fluid for the hydraulic cylinder 21, which is, in other words, the assist force of the hydraulic cylinder 21, is changed in correspondence with the operating state of the vehicle. As a result, unlike the conventional hydraulic power steering apparatus, the assist force of the hydraulic cylinder is controlled with improved flexibility.

(2) The flow control valve 23 is controlled based on the open degree command value TA, which is calculated using the steering torque τ, the steering angle θ, and the vehicle speed V. As a result, compared to the conventional hydraulic power steering apparatus, the assist force is controlled with enhanced accuracy.

(3) The supply/drainage mode of the hydraulic fluid for the hydraulic cylinder 21 is set through control by the flow control valve 23, without necessitating steering by the driver. This ensures execution of parking assist control.

(4) When the motor 54 is stopped, the shape restoration force of the torsion bar 56 maintains the valve portion 53 in the neutral mode. This simplifies the configuration of the valve portion 53, compared to a configuration in which the valve portion 53 is maintained in the neutral mode through actuation of the motor 54. Further, even if the motor 54 malfunctions, the valve portion 53 is returned automatically to the neutral mode. This prevents generation of undesired assist force with respect to the hydraulic cylinder 21.

Second Embodiment

A second embodiment of the present invention will now be described with reference to FIGS. 6A to 6C. Same or like reference numerals are given to components of the second embodiment that are the same as or like corresponding components of the first embodiment. Detailed description of the components will be omitted herein.

Figure 6A:
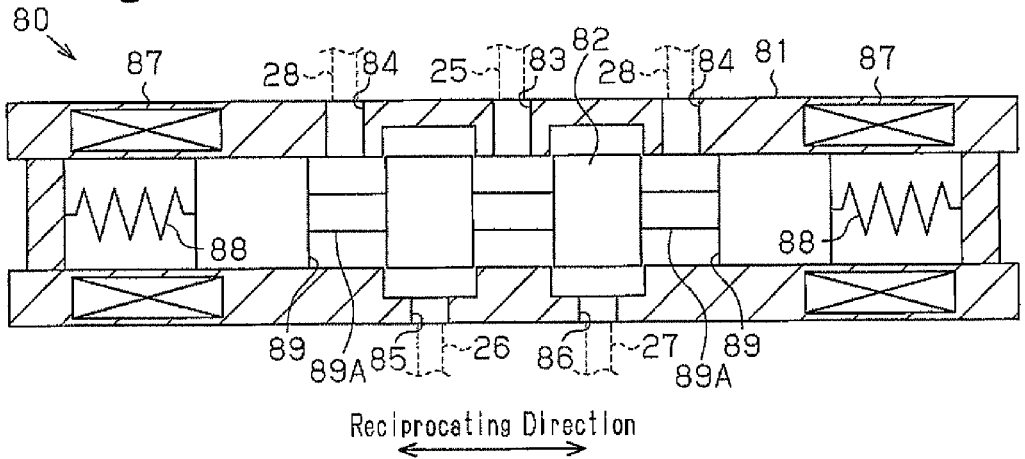
FIG. 6A is a longitudinal cross-sectional view showing a flow control valve of a hydraulic power steering apparatus according to a second embodiment of the invention.

With reference to FIG. 6A, a flow control valve 80 has a housing 81 and a valve portion 82, which is accommodated in the housing 81. The valve portion 82 reciprocates in a longitudinal direction of the housing 81. Iron core portions 89, which are formed by magnetic bodies, are fixed to the two ends of the valve portion 82 through corresponding joint shafts 89A.

The housing 81 has a supply port 83, two drainage ports 84, a first port 85, and a second port 86. The first port 85 communicates with the first hydraulic chamber 43 through the second fluid passage 26. The second port 86 communicates with the second hydraulic chamber 44 through the third fluid passage 27. The ports are arranged at different positions in the longitudinal direction of the housing 81. Coils 87 are formed at the two ends of the housing 81. The iron core portions 89 are attracted by the electromagnetic force produced by the corresponding coils 87, thus causing the valve portion 82 to reciprocate together with the iron core portions 89. The coils 87 and the iron core portions 89 configure electromagnetic solenoids each serving as a drive mechanism.

A coil spring 88 serving as an elastic member is attached to each of the iron core portions 89. The end of each of the coil springs 88 opposite to the associated one of the iron core portions 89 is secured to the housing 81. Each coil spring 88 urges the associated iron core portion 89 separately from the corresponding coil 87.

In the flow control valve 80, the valve portion 82 reciprocates together with the iron core portions 89 to switch the communication modes of the ports 83, 84, 85, 86 among three modes as will be described. Specifically, in the first mode for setting the valve portion 82 at the first supply position, the supply port 83 communicates with the first port 85 (the first hydraulic chamber 43) and the corresponding drainage port 84 communicates with the second port 86 (the second hydraulic chamber 44). In the second mode for setting the valve portion 82 at the second supply position, the supply port 83 communicates with the second port 86 (the second hydraulic chamber 44) and the corresponding drainage port 84 communicates with the first port 85 (the first hydraulic chamber 43). In the neutral mode for setting the valve portion 82 at the axial neutral position, the supply port 83 and the drainage ports 84 communicate with the first port 85 and the second port 86 through the gaps between the housing 81 and the corresponding valve bodies 82A, 82B.

Switching among the three modes is carried out based on the position of the valve portion 82 in the reciprocating direction relative to the housing 81. The position of the valve portion 82 is regulated by adjusting the attractive force of each coil 87 for attracting the associated iron core portion 89.

In other words, the position of the valve portion 82 is determined in correspondence with the electric current supplied to each coil 87.

Through reciprocation of the valve portion 82, the flow control valve 80 adjusts the amount of the hydraulic fluid supplied to the second fluid passage 26 (the first hydraulic chamber 43) and the amount of the hydraulic fluid drained from the third fluid passage 27 (the second hydraulic chamber 44) in the first mode. The flow control valve 80 also adjusts the amount of the hydraulic fluid supplied to the second hydraulic chamber 44 and the amount of the hydraulic fluid drained from the first hydraulic chamber 43 in the second mode.

In this case, by controlling the open degree of the first port 85 in the first mode or the open degree of the second port 86 in the second mode based on the open degree command value TA, the amount of the hydraulic fluid supplied to each of the ports is controlled. In other words, the amount of electric current in each coil 87 is controlled to achieve the demanded open degree of the first port 85 or the demanded open degree of the second port 86. This adjusts the supply/drainage amount of the hydraulic fluid for the ports 85, 86, or, in other words, the supply/drainage amount of the hydraulic fluid for the hydraulic chambers 43, 44 of the hydraulic cylinder 21.

After electric current supply to the coils 87 are suspended in the first mode or the second mode, the shape restoration force of each coil spring 88 maintains the valve portion 82 in the neutral mode, as illustrated in FIG. 6A.

The paths of the hydraulic fluid in the flow control valve 80 will hereafter be described.

When steering is not performed, such as when the vehicle proceeds linearly or is stopped, the valve portion 82 is arranged at such a position that the first port 85 and the second port 86 are both blocked, as shown in FIG. 6A. In other words, the flow control valve 80 is maintained in the neutral mode. In this state, the electric pump 22 is stopped.

Figure 6B:
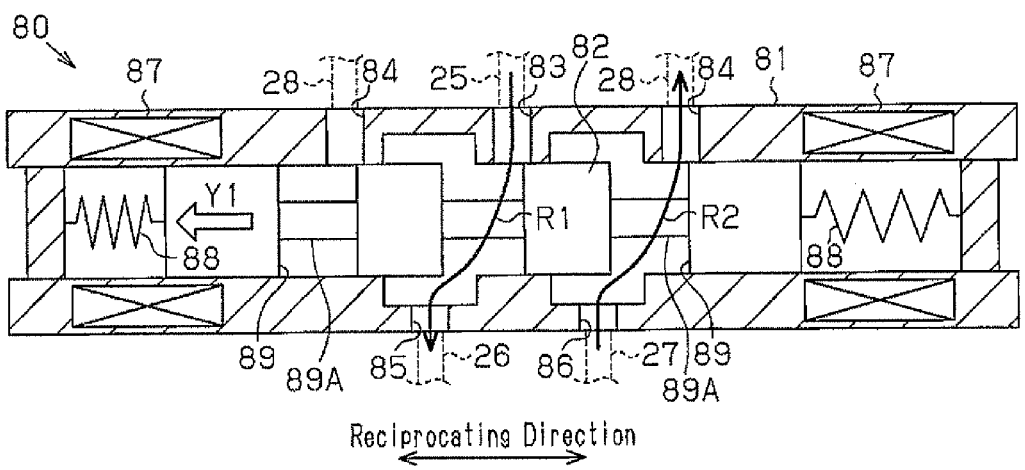
FIG. 6B is a longitudinal cross-sectional view showing a flow control valve at the time when the vehicle turns leftward.

When the vehicle is steered to turn leftward, an electric current is supplied to the coil 87 at the left side to move the valve portion 82 as indicated by arrow Y1 in FIG. 6B. The valve portion 82 is thus switched to the first mode in which the supply port 83 communicates with the first port 85. In this state, as indicated by arrow R1, the hydraulic fluid that has been sent from the supply port 83 is supplied to the first hydraulic chamber 43 (see FIG. 1) via the first port 85. On the other hand, the hydraulic fluid that has been sent from the second hydraulic chamber 44 (see FIG. 1) to the flow control valve 80 flows from the second port 86 to the corresponding drainage port 84, as indicated by arrow R2, and is drained to the reservoir tank 24 (see FIG. 1) via the fourth fluid passage 28.

Figure 6C:
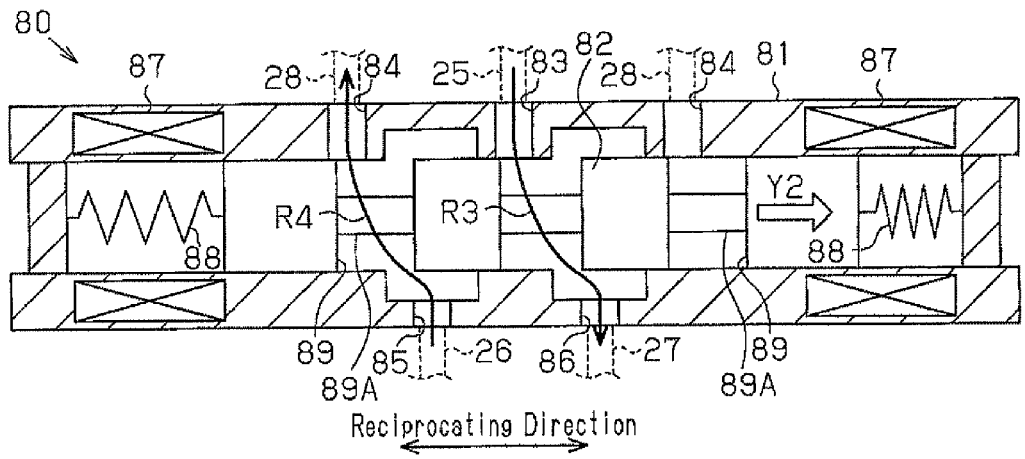
FIG. 6C is a longitudinal cross-sectional view showing the flow control valve at the time when the vehicle turns rightward.

When the vehicle is steered to turn rightward, an electric current is supplied to the coil 87 at the right side to move the valve portion 82 as indicated by arrow Y2 in FIG. 6C. The valve portion 82 is thus switched to the second mode in which the supply port 83 communicates with the second port 86. In this state, as indicated by arrow R3, the hydraulic fluid that has been sent from the supply port 83 is supplied to the second hydraulic chamber 44 via the second port 86. On the other hand, the hydraulic fluid that has been sent from the first hydraulic chamber 43 to the flow control valve 80 flows from the first port 85 to the corresponding drainage port 84, as indicated by arrow R4, and is drained to the reservoir tank 24 via the fourth fluid passage 28.

The second embodiment has the advantages described below.

(5) The coil springs 88 are arranged at both ends of the valve portion 82. When electric current supplied to the coils 87 is suspended, the valve portion 82 is maintained in the neutral mode by the shape restoration force of the coil springs 88. This simplifies the configuration of the valve portion 82, compared to the conventional configuration in which the position of the valve portion 82 is controlled only through the electric current supply to the coils 87. Further, even if the coils 87 malfunction, the valve portion 82 is returned automatically to the neutral mode. As a result, generation of undesired assist force with respect to the hydraulic cylinder 21 is prevented.

Third Embodiment

A third embodiment of the present invention will now be described with reference to FIGS. 7 to 15. Same or like reference numerals are given to components of the third embodiment that are the same as or like corresponding components of the first embodiment. Detailed description of the components will be omitted herein.

Figure 7:
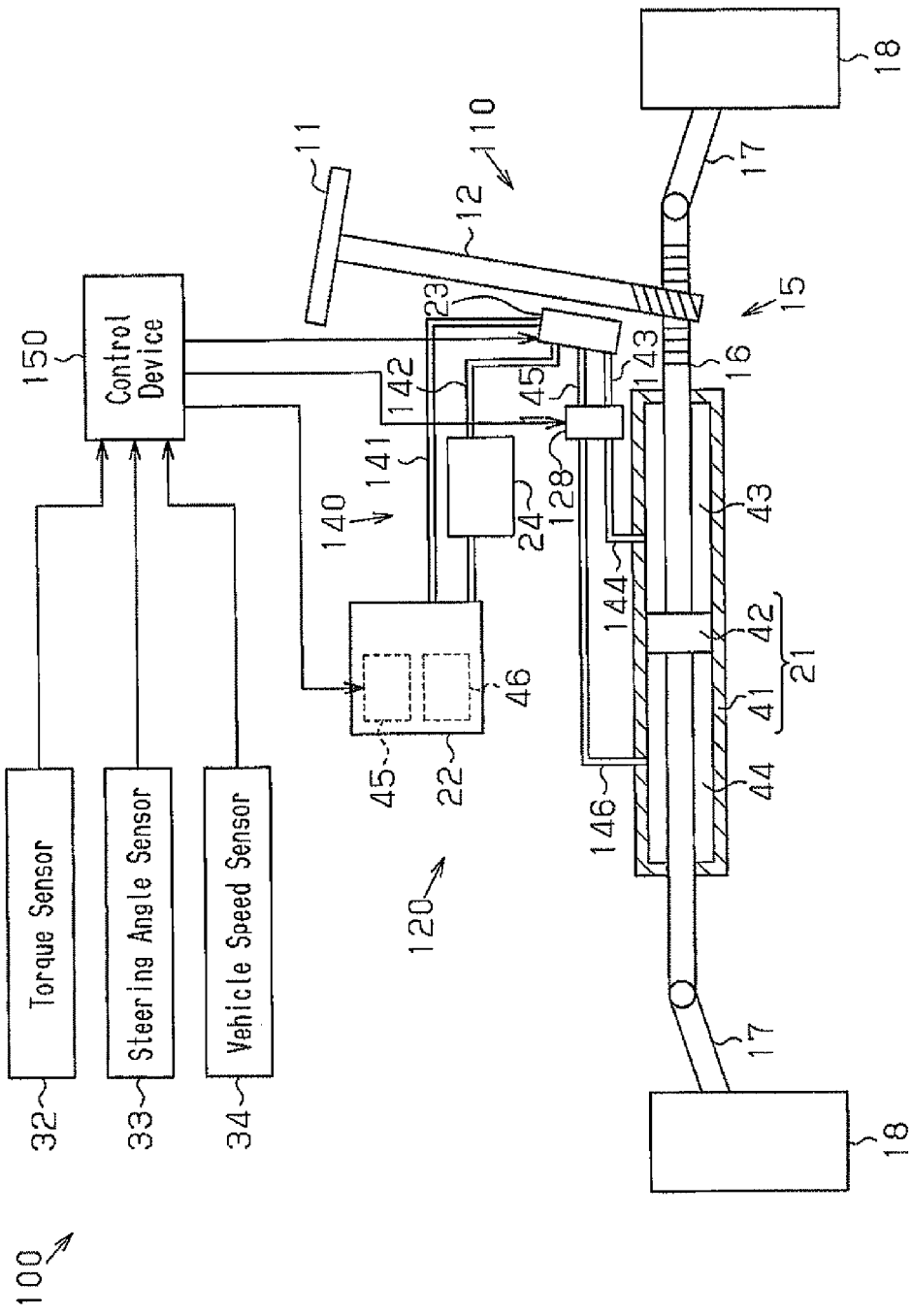
FIG. 7 is a schematic view showing the configuration of a hydraulic power steering apparatus according to a third embodiment of the invention as a whole.

As shown in FIG. 7, a hydraulic power steering apparatus 100 includes a steering device 110, an assist device 120, and a control device 150. The steering device 110 transmits manipulation of the steering wheel 11 to the steered wheels 18. The assist device 120 assists in the manipulation of the steering wheel 11 by applying necessary force. The control device 150 controls the assist device 120. Specifically, control of the assist device 120 by the control device 150 is based on outputs from the torque sensor 32, the steering angle sensor 33, and the vehicle speed sensor 34. The torque sensor 32 outputs a signal corresponding to the steering torque applied to the steering shaft 12 to the control device 150. The steering angle sensor 33 provides the signal corresponding to a rotating angle of the steering shaft 12, which is the steering angle, to the control device 150. The vehicle speed sensor 34 outputs the signal corresponding to the rotating speed of the steered wheels 18 to the control device 150. As the steering wheel 11 is manipulated, the hydraulic pressure in the assist device 120 is controlled to apply axial force to the rack shaft 16. This decreases the force for manipulating the steering wheel 11 necessary for axially moving the rack shaft 16. In other words, the assist device 120 reduces the force needed for manipulating the steering wheel 11.

The assist device 120 includes the hydraulic cylinder 21, the electric pump 22, the flow control valve 23, and the reservoir tank 24. The hydraulic cylinder 21 applies hydraulic pressure to the rack shaft 16. The electric pump 22 supplies hydraulic fluid to the hydraulic cylinder 21. The flow control valve 23 controls the supply/drainage mode of the hydraulic fluid for the hydraulic cylinder 21. The reservoir tank 24 retains the hydraulic fluid. The assist device 120 also has a bypass valve 128 and a fluid passage 140. The bypass valve 128 allows the hydraulic fluid to flow between the first hydraulic chamber 43 and the second hydraulic chamber 44 of the hydraulic cylinder 21 without passing through the flow control valve 23. The fluid passage 140 interconnects the components of the assist device 120.

The fluid passage 140 includes fluid passage sections 141, 142, 143, 144, 145, and 146, as will be described.

(a) A fluid supply passage section 141 connects the reservoir tank 24 to the supply ports 62 of the flow control valve 23 through the electric pump 22.

(b) A fluid drainage passage section 142 connects the drainage port 65 of the flow control valve 23 to the reservoir tank 24.

(c) A first upstream fluid passage section 143 connects the first ports 61 of the flow control valve 23 to the bypass valve 128.

(d) A first downstream fluid passage section 144 connects the bypass valve 128 to the first hydraulic chamber 43 of the hydraulic cylinder 21.

(e) A second upstream fluid passage section 145 connects the second ports 63 of the flow control valve 23 to the bypass valve 128.

(f) A second downstream fluid passage section 146 connects the bypass valve 128 to the second hydraulic chamber 44 of the hydraulic cylinder 21.

Figure 9:
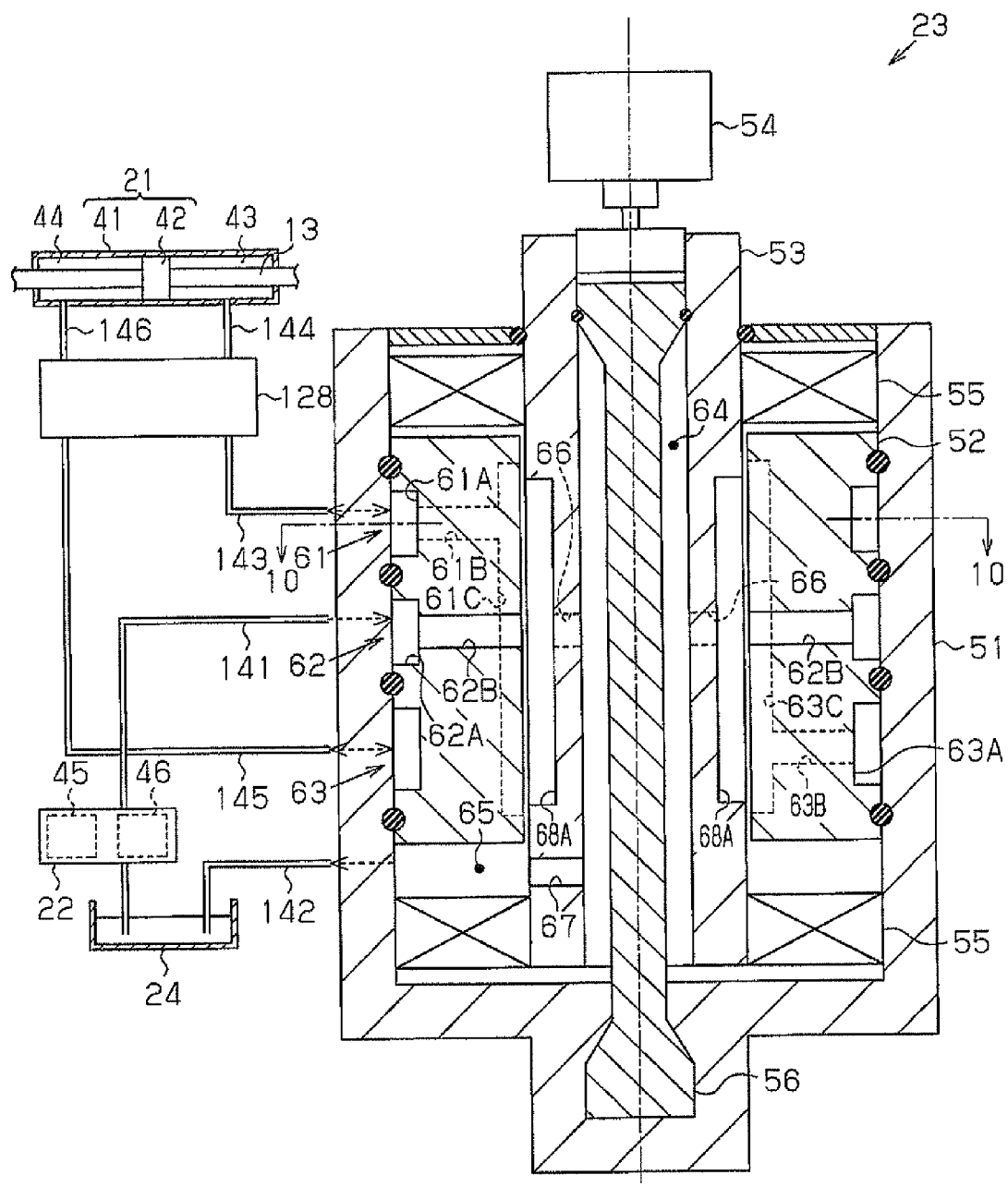
FIG. 9 is a longitudinal cross-sectional view showing a flow control valve.

With reference to FIG. 9, the fluid supply passage section 141, the fluid drainage passage section 142, the first upstream fluid passage section 143, and the second upstream fluid passage section 145 are each connected to the housing 51 of the flow control valve 23.

The first hydraulic chamber 43 is connected to the bypass valve 128 through the first downstream fluid passage section 144. The second hydraulic chamber 44 is connected to the bypass valve 128 through the second downstream fluid passage section 146.

The bypass valve 128 has a solenoid valve for changing the connection states of the first upstream fluid passage section 143, the second upstream fluid passage section 145, the first downstream fluid passage section 144, and the second downstream fluid passage section 146. The bypass valve 128 is switchable between the state in which the first and second hydraulic chambers 43, 44 are connected to the flow control valve 23 without communicating with each other and the state in which the first and second hydraulic chambers 43, 44 communicate with each other.

Control in the hydraulic power steering apparatus 100 will hereafter be described with reference to FIG. 8.

Figure 8:
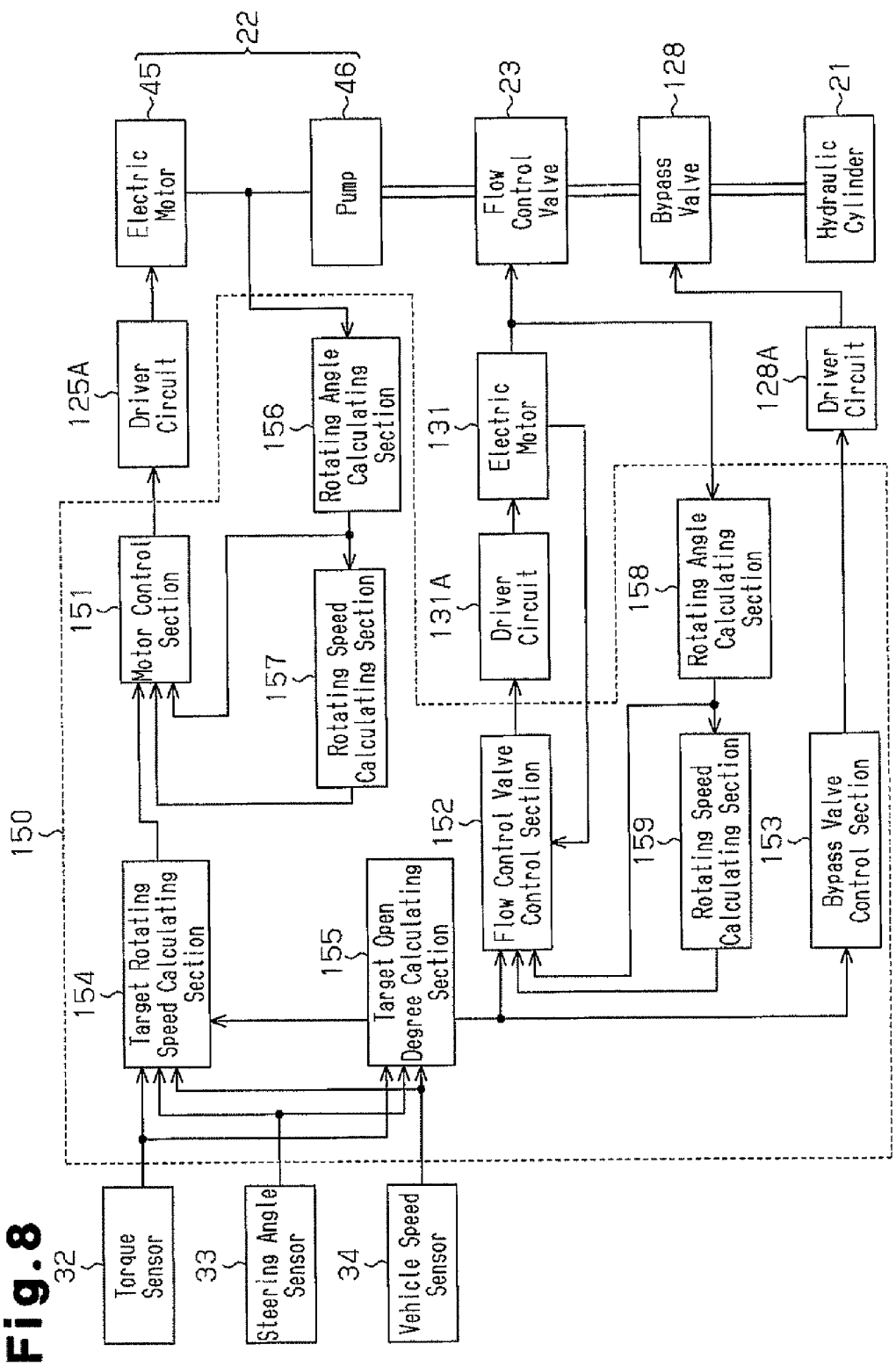
FIG. 8 is a block diagram representing control in the hydraulic power steering apparatus.

As illustrated in FIG. 8, the control device 150 has a motor control section 151 for controlling the electric motor 45, a flow control valve control section 152 for controlling the flow control valve 23, and a bypass valve control section 153 for controlling the bypass valve 128.

The control device 150 also includes a target rotating speed calculating section 154, a target open degree calculating section 155, a rotating angle calculating section 156, a rotating speed calculating section 157, a rotating angle calculating section 158, and a rotating speed calculating section 159. The target rotating speed calculating section 154 calculates the target rotating speed for the electric motor 45. The target open degree calculating section 155 calculates the target open degree for the flow control valve 23 and the bypass valve 128. The rotating angle calculating section 156 detects the rotating angle of the electric motor 45. The rotating speed calculating section 157 detects the rotating speed of the electric motor 45. The rotating angle calculating section 158 detects the rotating angle of the motor 54. The rotating speed calculating section 159 detects the rotating speed of the motor 54. The control sections 151 to 153 and the calculating sections 154 to 159 are each configured by an electronic circuit, such as an integrated circuit, which performs calculation.

The control device 150 executes assist control for assisting in manipulation of the steering wheel 11. Specifically, the assist device 120 adjusts the level of the hydraulic pressure applied to the rack shaft 16 based on the traveling state of the vehicle, the manipulating state of the steering wheel 11, and the operating state of the hydraulic power steering apparatus 100.

The assist control includes displacement control on the electric pump 22 (hereinafter, "control A"), control of the communication state on each fluid passage by the flow control valve 23 ("control B"), and control of the communication state on each hydraulic chamber in the hydraulic cylinder 21 by the bypass valve 128 ("control C").

(Control A) The target open degree calculating section 155 calculates the target open degree of the flow control valve 23 based on the outputs of the torque sensor 32, the steering angle sensor 33, and the vehicle speed sensor 34. The target rotating speed calculating section 154 calculates the target rotating speed of the electric motor 45 based on the outputs of the torque sensor 32, the steering angle sensor 33, and the vehicle speed sensor 34 and the target open degree input from the target open degree calculating section 155.

The rotating angle calculating section 156 calculates the rotating angle of the electric motor 45 based on the value of an electric current in the electric motor 45. The rotating speed calculating section 157 calculates the rotating speed of the electric motor 45 based on the rotating angle input from the rotating angle calculating section 156.

The motor control section 151 feedback-controls the electric motor 45 through a driver circuit 125A based on the target rotating speed for the electric motor 45 provided by the target rotating speed calculating section 154, the rotating angle of the electric motor 45 input from the rotating angle calculating section 156, and the rotating speed of the electric motor 45 provided by the rotating speed calculating section 157. The driver circuit 125A is configured by a PWM driver circuit including a switching element.

(Control B) The rotating angle calculating section 158 calculates the rotating angle of the motor 54 based on the electric current value of the motor 54. The rotating speed calculating section 159 calculates the rotating speed of the motor 54 based on the rotating angle of the motor 54, which is input from the rotating angle calculating section 158.

The flow control valve control section 152 feedback-controls the motor 54 through a driver circuit 131A based on the target open degree for the flow control valve 23 provided by the target open degree calculating section 155, the rotating angle of the motor 54 input from the rotating angle calculating section 158, and the rotating speed of the motor 54 provided by the rotating speed calculating section 159. This drives the flow control valve 23 in correspondence with operation of the motor 54. The driver circuit 31A is configured by a PWM driver circuit including a switching element.

(Control C) The bypass valve control section 153 controls the bypass valve 128 through a driver circuit 128A based on the target open degree provided by the target open degree calculating section 155. The driver circuit 128A is configured by a solenoid driver circuit.

The configuration of the bypass valve 128 will hereafter be described with reference to FIG. 9.

As shown in FIG. 9, the bypass valve 128 is connected to the first ports 61 of the flow control valve 23 through the first upstream fluid passage section 143. The bypass valve 128 is connected also to the second ports 63 of the flow control valve 23 through the second upstream fluid passage section 145.

The bypass valve 128 operates in a basic connection mode or a bypass mode. When manipulation of the steering wheel 11 must be assisted by the assist device 120, the basic connection mode is selected. When assisting by the assist device 120 is difficult, the bypass mode is selected.

In the basic connection mode, the first upstream fluid passage section 143 communicates with the first downstream fluid passage section 144 and the second upstream fluid passage section 145 communicates with the second downstream fluid passage section 146. In other words, each first port 61 communicates with the first hydraulic chamber 43 and each second port 63 communicates with the second hydraulic chamber 44.

In the bypass mode, the first downstream fluid passage section 144 communicates with the second downstream fluid passage section 146. That is, the bypass valve 128 cancels disconnection between the first upstream and downstream fluid passage sections 143, 144 and the second upstream and downstream fluid passage sections 145, 146. This allows communication between the first hydraulic chamber 43 and the second hydraulic chamber 44.

The relationship between the regulation valve 52 and the valve portion 53 will hereafter be described with reference to FIGS. 10 to 11B.

In the flow control valve 23, the relationship between the fluid supply and drainage passage sections 141, 142 and the first and second upstream fluid passage sections 143, 145 changes in the manner described below, depending on the rotating position of the valve portion 53 relative to the regulation valve 52.

Figure 10:
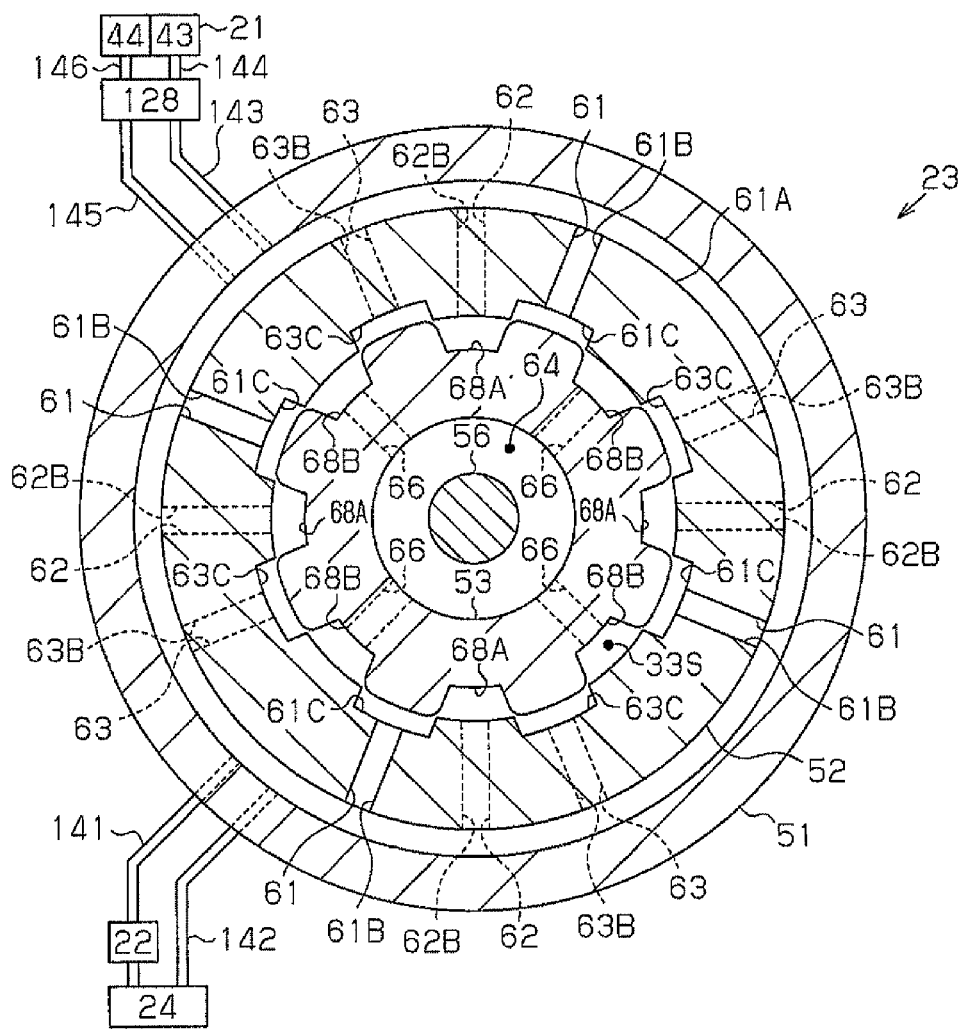
FIG. 10 is a cross-sectional view taken along line 10-10 of FIG. 9 at the time when a valve portion is arranged at a neutral rotating position.

As illustrated in FIG. 10, when the valve portion 53 is arranged at the "neutral rotating position", the supply ports 62 and the drainage port 65 communicate with the first ports 61 and the second ports 63 through the gap between the regulation valve 52 and the valve portion 53 (the neutral mode).

Figure 11A:
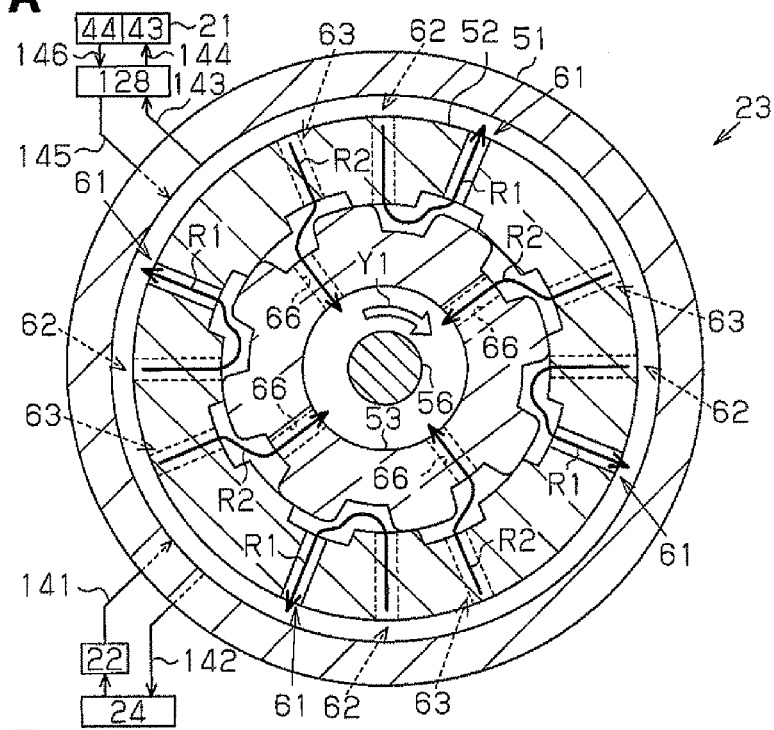
FIG. 11A is a cross-sectional view taken along line 10-10 of FIG. 9 at the time when the valve portion is arranged at a first supply position.

With reference to FIG. 11A, when the valve portion 53 is held at the "first supply position", the supply ports 62 communicate with the first ports 61 and the drainage port 65 communicates with the second ports 63 (the first mode).

Figure 11B:
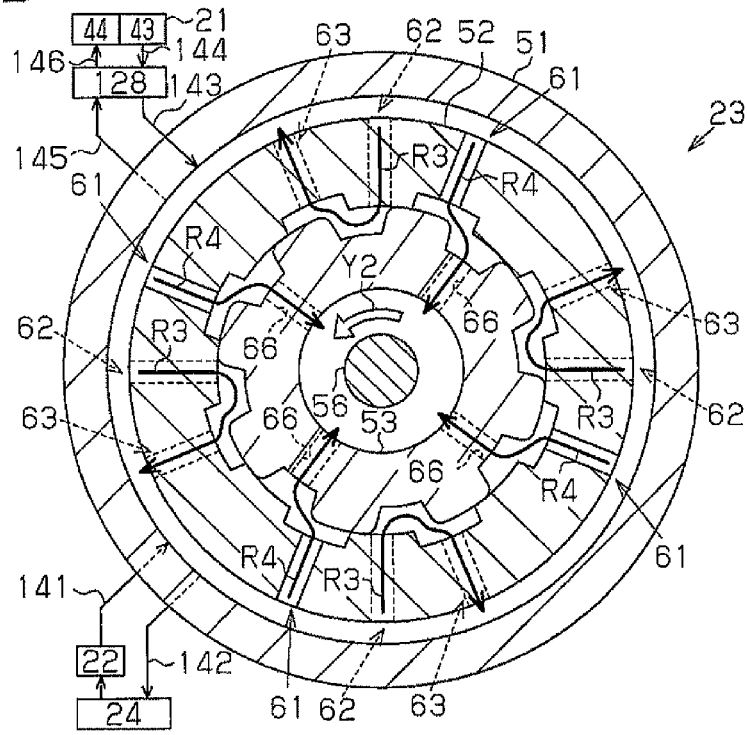
FIG. 11B is a cross-sectional view taken along line 10-10 of FIG. 9 at the time when the valve portion is arranged at a second supply position.

As illustrated in FIG. 11B, when the valve portion 53 is arranged at the "second supply position", the supply ports 62 communicate with the second ports 63 and the drainage port 65 communicates with the first ports 61 (the second mode).

Control modes of the control device 150 for the flow control valve 23 will hereafter be described.

The control device 150 selects an operating mode for the flow control valve 23 in correspondence with the manipulating state of the steering wheel 11. Specifically, when the steering wheel 11 is not manipulated, the neutral mode is selected as the operating mode of the flow control valve 23. When the steering wheel 11 is turned rightward, the first mode is selected as the operating mode of the flow control valve 23. When the steering wheel 11 is turned leftward, the second mode is selected as the operating mode of the flow control valve 23.

If the rotating position of the valve portion 53 does not coincide with the rotating position corresponding to the selected operating mode, or, for example, the first mode is selected when the valve portion 53 is arranged at the neutral rotating position, the electric current value of the motor 54 is changed to rotate the valve portion 53 to the rotating position corresponding to the selected operating mode.

The paths of the hydraulic fluid in the flow control valve 23 will hereafter be described. The hydraulic fluid flows along the paths described below on the premise that the operating mode of the bypass valve 128 is set to the basic connection mode.

(A) The hydraulic fluid flows in the paths described below when the flow control valve 23 is in the neutral mode.

With reference to FIG. 10, when the first mode or the second mode is switched to the neutral mode, the valve portion 53 is rotated from the first or second supply position to the neutral rotating position. As a result, the first ports 61 and the second ports 63 both communicate with the supply ports 62 and the inner space 64 (the drainage port 65) through the gap between the regulation valve 52 and the valve portion 53.

In this state, a small amount of hydraulic fluid is supplied from the supply ports 62 to the first ports 61 and the second ports 63. Also, a small amount of hydraulic fluid is sent from the first ports 61 and the second ports 63 to the inner space 64 (the drainage port 65). This maintains the hydraulic pressure in the first hydraulic chamber 43 and the second hydraulic chamber 44 substantially constant.

(B) The hydraulic fluid flows in the paths described below when the flow control valve 23 is in the first mode.

As illustrated in FIG. 11A, when the neutral mode is switched to the first mode, the valve portion 53 is rotated in the direction indicated by arrow Y1. This switches the rotating position of the valve portion 53 from the neutral rotating position to the first supply position. As a result, the supply ports 62 communicate with the first ports 61 and the drainage port 65 communicates with the second ports 63.

The hydraulic fluid sent out from the electric pump 22 is supplied to the first hydraulic chamber 43 in the hydraulic cylinder 21 via the fluid supply passage section 141, the supply ports 62, the first ports 61, the first upstream fluid passage section 143, the bypass valve 128, and the first downstream fluid passage section 144. In the flow control valve 23, as indicated by each arrow R1, the hydraulic fluid flows in the order of the supply communication hole 62B, a valve body supply groove 68A, the first longitudinal axial groove 61C, the first communication hole 61B, and the first annular groove 61A.

The hydraulic fluid in the second hydraulic chamber 44 of the hydraulic cylinder 21 is returned to the reservoir tank 24 via the second downstream fluid passage section 146, the bypass valve 128, the second upstream fluid passage section 145, the second ports 63, the inner space 64, the drainage port 65, and the fluid drainage passage section 142. In the flow control valve 23, as indicated by each arrow R2, the hydraulic fluid flows in the order of the second annular groove 63A, the second communication hole 63B, the second longitudinal axial groove 63C, a valve body drainage groove 68B, the inlet communication hole 66, and the inner space 64.

(C) The hydraulic fluid flows in the paths described below when the flow control valve 23 is in the second mode.

With reference to FIG. 11B, when the neutral mode is switched to the second mode, the valve portion 53 is rotated in the direction indicated by arrow Y2. The valve portion 53 is thus moved from the neutral rotating position to the second supply position. As a result, the supply ports 62 communicate with the second ports 63 and the drainage port 65 communicates with the first ports 61.

The hydraulic fluid sent out from the electric pump 22 is supplied to the second hydraulic chamber 44 in the hydraulic cylinder 21 via the fluid supply passage section 141, the supply ports 62, the second ports 63, the second upstream fluid passage section 145, the bypass valve 128, and the second downstream fluid passage section 146. In the flow control valve 23, as indicated by each arrow R3, the hydraulic fluid flows in the order of the supply communication hole 62B, the valve body supply groove 68A, the second longitudinal axial groove 63C, the second communication hole 63B, and the second annular groove 63A.

The hydraulic fluid in the first hydraulic chamber 43 of the hydraulic cylinder 21 is returned to the reservoir tank 24 via the first downstream fluid passage section 144, the bypass valve 128, the first upstream fluid passage section 143, the first ports 61, the inner space 64, the drainage port 65, and the fluid drainage passage section 142. In the flow control valve 23, as indicated by each arrow R4, the hydraulic fluid flows in the order of the first annular groove 61A, the first communication hole 61B, the first longitudinal axial groove 61C, the valve body drainage groove 68B, the inlet communication hole 66, and the inner space 64.

The amount of the hydraulic fluid supplied to the hydraulic cylinder 21 is regulated in the manner described below.

With reference to FIG. 9, the control device 150 regulates the amount of the hydraulic fluid supplied to the first hydraulic chamber 43 and the second hydraulic chamber 44 in the hydraulic cylinder 21 by controlling the rotating speed of the electric pump 22 (the rotating speed of the electric motor 45) and the open degree of the flow control valve 23. The supply amount of the hydraulic fluid becomes greater as the rotating speed of the electric pump 22 becomes higher and as the open degree of the flow control valve 23 becomes greater.

The open degree of the flow control valve 23 will hereafter be described in detail with reference to FIG. 10.

The flow control valve 23 has four types of open degrees as described below.

(a) A first supply open degree for changing the supply amount of the hydraulic fluid for the first hydraulic chamber 43.

(b) A second supply open degree for changing the supply amount of the hydraulic fluid for the second hydraulic chamber 44.

(c) A first drainage open degree for changing the drainage amount of the hydraulic fluid for the first hydraulic chamber 43.

(d) A second drainage open degree for changing the drainage amount of the hydraulic fluid for the second hydraulic chamber 44.

Specifically, the aforementioned open degrees correspond to the portions of the flow control valve 23 described below.

The first supply open degree corresponds to the communication area of the passage that allows communication between the first longitudinal axial groove 61C of each first port 61 and the valve body supply groove 68A. The second supply open degree corresponds to the communication area of the passage that allows communication between the second longitudinal axial groove 63C of each second port 63 and the valve body supply groove 68A. The first drainage open degree corresponds to the communication area of the passage that allows communication between the first longitudinal axial groove 61C of each first port 61 and the valve body drainage groove 68B. The second drainage open degree corresponds to the communication area of the passage that allows communication between the second longitudinal axial groove 63C of each second port 63 and the valve body drainage groove 68B.

The content of the assist control will now be described in detail with reference to FIG. 7.

When the torque sensor 32 malfunctions, the assist control, which needs an output of the torque sensor 32, cannot be carried out appropriately. In this case, assisting in manipulation of the steering wheel 11 through the assist control may be stopped. However, this makes it necessary for the driver to manipulate the steering wheel 11 without being assisted by the assist device 120. Accordingly, to facilitate the driver's operation, a different method is desired to deal with such malfunction of the torque sensor 32.

In the third embodiment, when a malfunction condition is satisfied, indicating that the torque sensor 32 malfunctions, using an output of the torque sensor 32 is prohibited and the hydraulic pressure in the hydraulic cylinder 21 is controlled using an output of the steering angle sensor 33. Specifically, the target rotating speed for the electric pump 22 is calculated using the steering speed obtained based on the output of the steering angle sensor 33. The electric pump 22 is controlled using the target rotating speed.

The assist control does not use an output of the vehicle speed sensor 34 to control the hydraulic pressure in the hydraulic cylinder 21 when the malfunction condition is satisfied. However, the output of the vehicle speed sensor 34 may be employed to control the hydraulic pressure in the hydraulic cylinder 21, in addition to the output of the steering angle sensor 33.

The content of the assist control related to a malfunction in the torque sensor 32 will hereafter be described in detail. The assist control includes "assist selection control" represented in FIG. 12, "normal-time assist control" represented in FIG. 13, and "malfunction-time assist control" represented in FIG. 14.

The content of the "assist selection control" will now be described with reference to FIG. 12.

Figure 12:
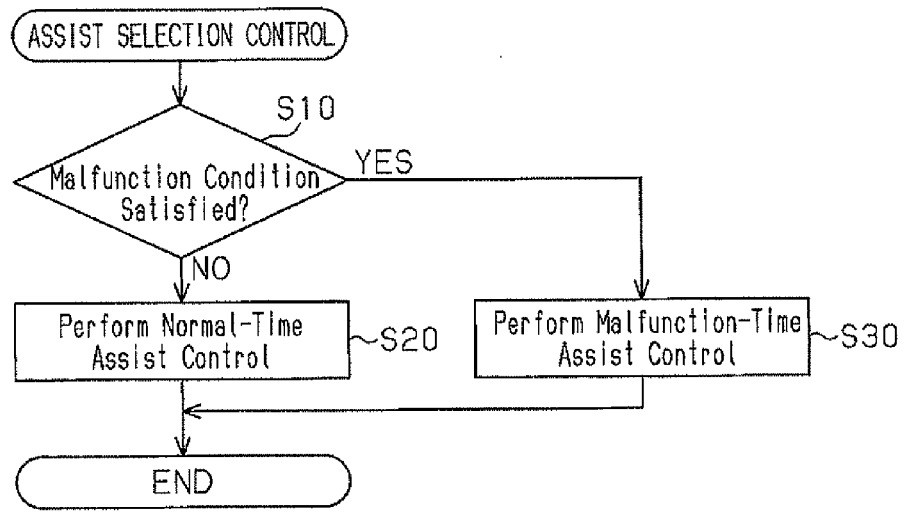
FIG. 12 is a flowchart representing the steps of assist selection control.

As represented in FIG. 12, in Step S10, the control device 150 determines whether the malfunction condition, which indicates that a malfunction has occurred in the torque sensor 32, is satisfied. The malfunction condition may be, for example, that an output of the torque sensor 32 is excessively small or great or that an output of the torque sensor 32 exhibits an excessively great change.

Figure 13:
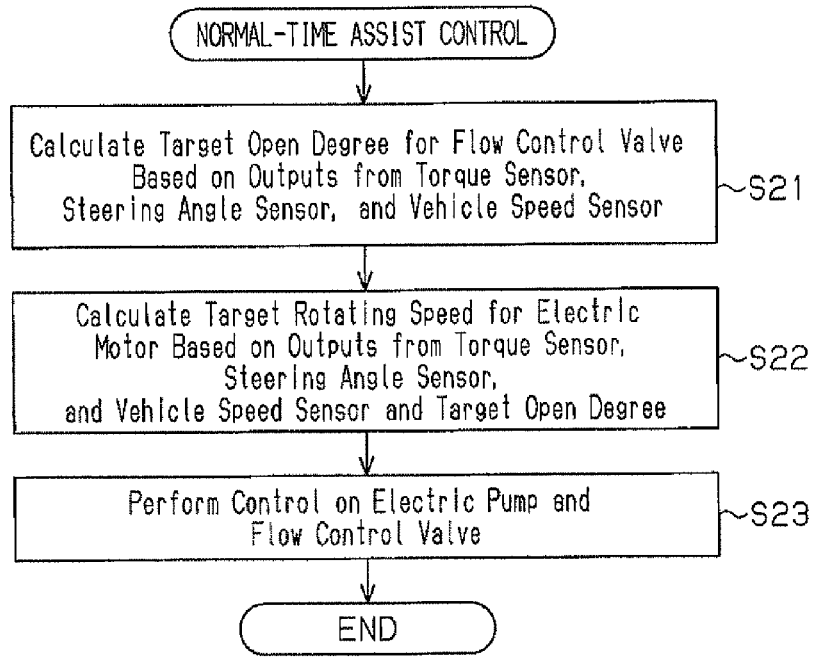
FIG. 13 is a flowchart representing the steps of normal-time assist control.
Figure 14:
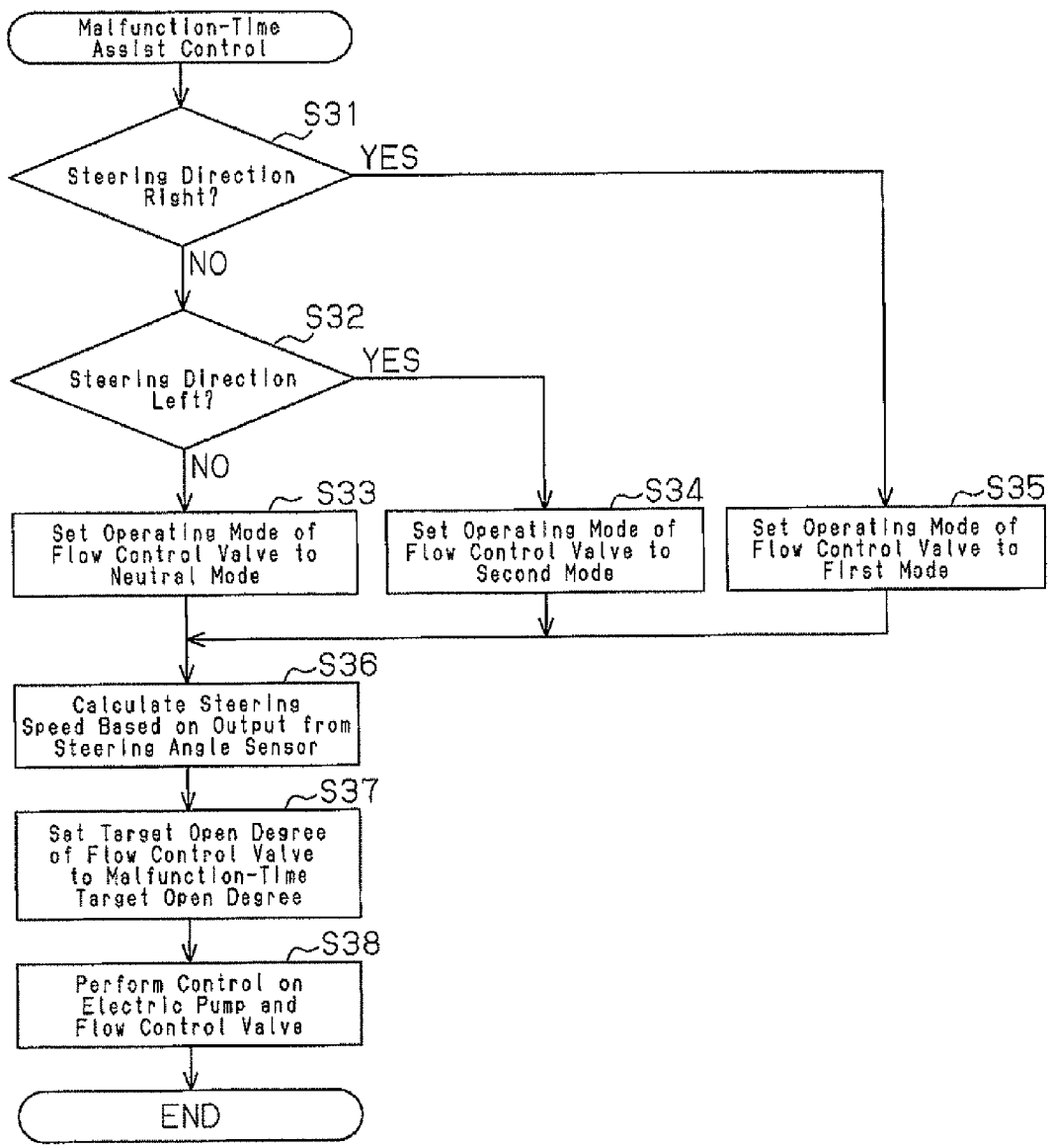
FIG. 14 is a flowchart representing the steps of malfunction-time assist control.

When it is determined that the malfunction condition is not satisfied in Step S10, the control device 150 executes the "normal-time assist control", as represented in FIG. 13, in Step S20. In contrast, if it is determined that the malfunction condition is satisfied in Step S10, the control device 150 performs the "malfunction-time assist control", as represented in FIG. 14, in Step S30.

Next, the "normal-time assist control" will be described with reference to FIG. 13.

Referring to FIG. 13, in Step S21, the control device 150 calculates the target open degree for the flow control valve 23 based on an output of the torque sensor 32, an output of the steering angle sensor 33, and an output of the vehicle speed sensor 34.

In Step S22, the control device 150 calculates the target rotating speed for the electric pump 22, which is the target rotating speed for the electric motor 45, based on an output of the torque sensor 32, an output of the steering angle sensor 33, an output of the vehicle speed sensor 34, and the target open degree that has been determined in Step S21.

In Step S23, the control device 150 controls the flow control valve 23 using the target open degree for the flow control valve 23 and the electric pump 22 using the target rotating degree for the electric pump 22. In this manner, with the output of the torque sensor 32 reflected, the hydraulic pressure in the hydraulic cylinder 21 is controlled.

The procedure of the "malfunction-time assist control" will hereafter be described with reference to FIG. 14.

As represented in FIG. 14, the control device 150 determines the manipulating state of the steering wheel 11 through determination in Step S31 and Step S32. Then, depending on the result, the control device 150 then performs Steps S33, S34, and S35 to select an operating mode for the flow control valve 23.

Referring to FIG. 14, in Step S31, the control device 150 determines whether the steering direction is the rightward direction based on an output of the steering angle sensor 33. In Step S32, the control device 150 determines whether the steering direction is the leftward direction using the output of the steering angle sensor 33. Then, depending on at least one of determinations in Steps S31 and S32, the control device 150 performs one of Steps S33 to S35.

(A) When positive determination is made in Step S31, the control device 150 sets the operating mode of the flow control valve 23 to the first mode in Step S35. As a result, in the hydraulic cylinder 21, the hydraulic fluid is supplied to the first hydraulic chamber 43 and drained from the second hydraulic chamber 44.

(B) If negative determination is made in Step S31 and positive determination is made in Step S32, the control device 150 sets the operating mode of the flow control valve 23 to the second mode in Step S34. As a result, in the hydraulic cylinder 21, the hydraulic fluid is drained from the first hydraulic chamber 43 and supplied to the second hydraulic chamber 44.

(C) When determination in Step S31 and determination in Step 32 are both negative, the control device 150 sets the operating mode of the flow control valve 23 to the neutral mode in Step S33. In this state, the hydraulic pressure in the hydraulic cylinder 21 is maintained substantially constant.

In Step S36, the control device 150 calculates the steering angle based on an output of the steering angle sensor 33 and then determines the steering speed using the steering angle. Specifically, the control device 150 obtains the steering speed as a change amount of the steering angle per unit time. The obtained steering speed corresponds to the steering speed of the steering wheel 11 and the steering shaft 12.

Figure 15:
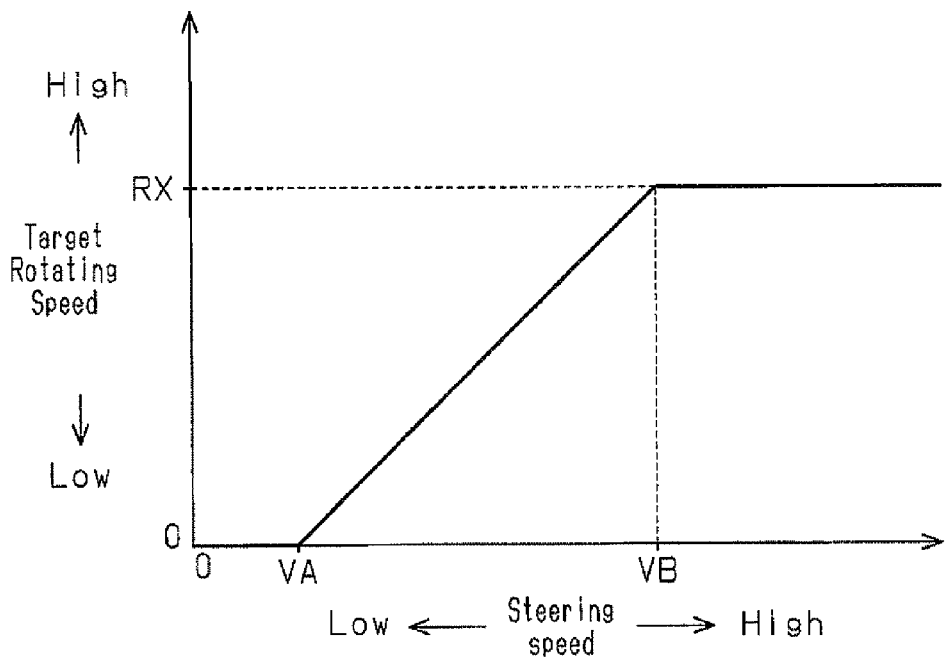
FIG. 15 is a map representing the relationship between steering speed and a target rotating speed of an electric motor.

Then, the control device 150 applies the steering speed to the malfunction-time target rotating speed map in FIG. 15 to determine the target rotating speed for the electric pump 22 corresponding to the steering speed. The malfunction-time rotating speed map defines the relationship between the steering speed and the target rotating speed in the manner described below.

(a) If the steering speed is not less than "0" and not more than a first speed VA, the target rotating speed is "0" regardless of the level of the steering speed.

(b) If the steering speed is not less than the first speed VA and not more than a second speed VB, the target rotating speed becomes higher as the steering speed becomes greater.

(c) If the steering speed is not less than the second speed VB, the target rotating speed is a maximum malfunction-time rotating speed RX regardless of the level of the steering speed.

In Step S37, the control device 150 sets a malfunction-time target open degree, which is set in advance, as the open degree of the flow control valve 23 for the malfunction time when the torque sensor 32 malfunctions. The malfunction-time rotating speed map is defined on the premise that the open degree of the flow control valve 23 is set to the malfunction-time target open degree.

In Step S38, the control device 150 controls the flow control valve 23 based on the target open degree of the flow control valve 23 and the electric pump 22 using the target rotating speed of the electric pump 22. As a result, the hydraulic pressure in the hydraulic cylinder 21 is controlled by reflecting the steering speed, without reflecting the output of the torque sensor 32.

The third embodiment has the advantages described below.

(6) When the torque sensor 32 outputs an erroneous detection, the hydraulic power steering apparatus 100 controls the hydraulic pressure in the hydraulic cylinder 21 in correspondence with the steering speed. This configuration prevents suspension of assisting by the assist device 120 when the steering wheel 11 is manipulated.

(7) The hydraulic power steering apparatus 100 calculates the steering speed based on an output of the steering angle sensor 33 and controls the hydraulic pressure in the hydraulic cylinder 21 using the steering speed. In this configuration, the steering speed is appropriately reflected in control of the hydraulic pressure in the hydraulic cylinder 21 when the torque sensor 32 malfunctions.

(8) When the malfunction condition for the torque sensor 32 is not satisfied, the hydraulic power steering apparatus 100 controls the hydraulic pressure in the hydraulic cylinder 21 based on outputs of the torque sensor 32, the steering angle sensor 33, and the vehicle speed sensor 34. In this configuration, assisting in manipulation of the steering wheel 11 by the assist device 120 becomes suitable for the actual manipulating state, compared to a configuration in which the hydraulic pressure in the hydraulic cylinder 21 is controlled using an output of the torque sensor 32 solely.

(9) Specifically, the malfunction described below occurs in a hydraulic power steering apparatus in which the torsion bar 56 is omitted from the flow control valve 23 of the hydraulic power steering apparatus 100, which is defined as a "comparative apparatus".

For example, there may be a case in which the motor 54 malfunctions with the valve portion 53 held at the first supply position. In this case, the motor 54 cannot change the rotating position of the valve portion 53 and the valve portion 53 is maintained at the first supply position. The hydraulic fluid is thus continuously supplied to the first hydraulic chamber 43. In this state, if the driver needs to turn the steering wheel 11 rightward, the driver's manipulation of the steering wheel 11 is hampered by the hydraulic pressure applied from the hydraulic cylinder 21 to the rack shaft 16. As a result, the steering wheel 11 must be manipulated with greater torque.

However, in the third embodiment, the valve portion 53 of the flow control valve 23 includes the torsion bar 56. In this configuration, when the torque of the motor 54 is not input to the valve portion 53, torque produced through torsion of the torsion bar 56 urges the valve portion 53 toward the neutral rotating position. The torsion bar 56 thus maintains the valve portion 53 at the neutral rotating position when the motor 54 cannot provide torque to the valve portion 53. As a result, when the motor 54 malfunctions, the driver's manipulation of the steering wheel 11 is prevented from being hampered by the hydraulic pressure applied from the hydraulic cylinder 21 to the rack shaft 16.

Fourth Embodiment

A fourth embodiment of the present invention will now be described with reference to FIGS. 16 to 17B. Same or like reference numerals are given to components of the fourth embodiment that are the same as or like corresponding components of the second embodiment.

Figure 16:
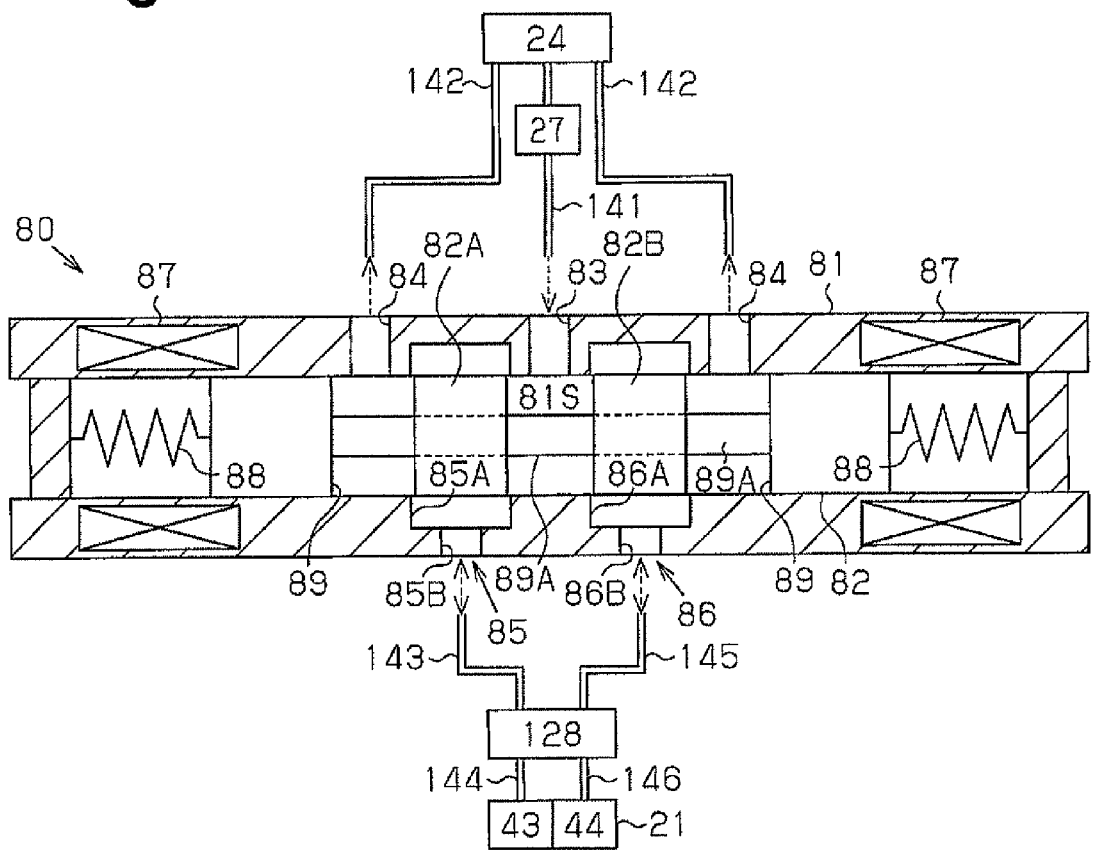
FIG. 16 is a longitudinal cross-sectional view showing a flow control valve mounted in a hydraulic power steering apparatus according to a fourth embodiment of the invention.

As shown in FIG. 16, the fluid supply passage section 141, the fluid drainage passage sections 142, the first upstream fluid passage section 143, and the second upstream fluid passage section 145 are connected to the housing 81 of the flow control valve 80. The first port 85 connected to the first upstream fluid passage section 143, the second port 86 connected to the second upstream fluid passage section 145, the supply port 83 connected to the fluid supply passage section 141, and the drainage ports 84 connected to the fluid drainage passage sections 142 are formed in the housing 81.

The outlet port of the electric pump 22 is connected to the supply port 83 through the fluid supply passage section 141. The first hydraulic chamber 43 is connected to the first port 85 through the first upstream fluid passage section 143 and the bypass valve 128. The second hydraulic chamber 44 is connected to the second port 86 through the second upstream fluid passage section 145 and the bypass valve 128. The reservoir tank 24 is connected to the drainage ports 84 through the fluid drainage passage sections 142.

The first port 85 is formed by the first annular groove 85A formed in the inner peripheral surface of the housing 81 and the first communication hole 85B, which allows communication between the first annular groove 85A and the first upstream fluid passage section 143. The first annular groove 85A communicates with the inner space of the housing 81.

The second port 86 is formed by the second annular groove 86A formed in the inner peripheral surface of the housing 81 and the second communication hole 86B, which allows communication between the second annular groove 86A and the second upstream fluid passage section 145. The second annular groove 86A communicates with the inner space of the housing 81.

The valve portion 82 includes a first valve body 82A, a second valve body 82B, and a joint shaft 89A for connecting the valve bodies 82A and 82B to each other. The first valve body 82A changes the open degree of the first port 85 in correspondence with the axial position of the valve portion 82 relative to the housing 81. The second valve body 82B changes the open degree of the second port 86 in correspondence with the axial position of the valve portion 82 relative to the housing 81.

Operation of the valve portion 82 will hereafter be described with reference to FIGS. 16 to 17B.

In the flow control valve 80, the relationship between the fluid supply and drainage fluid passage sections 141, 142 and the first and second upstream fluid passage sections 143, 145 is changed depending on the axial position of the valve portion 82.

With reference to FIG. 16, when the axial position of the valve portion 82 is arranged at the "axial neutral position", the supply port 83 and the drainage ports 84 communicate with the first port 85 and the second port 86 through the gaps between the housing 81 and the corresponding valve bodies 82A, 82B (the neutral mode).

Figure 17A:
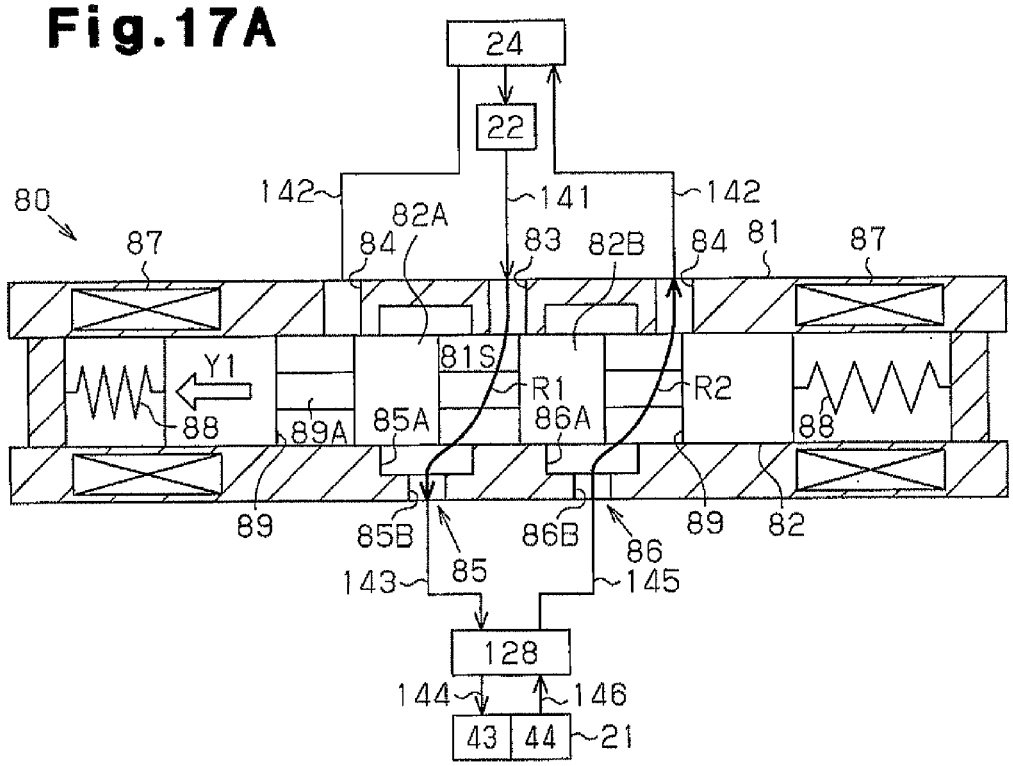
FIG. 17A is a longitudinal cross-sectional view showing a flow control valve at the time when a valve portion is arranged at a first supply position.

As illustrated in FIG. 17A, when the axial position of the valve portion 82 is the "first supply position", the supply port 83 communicates with the first port 85 and the corresponding drainage port 84 communicates with the second port 86 (the first mode).

Figure 17B:
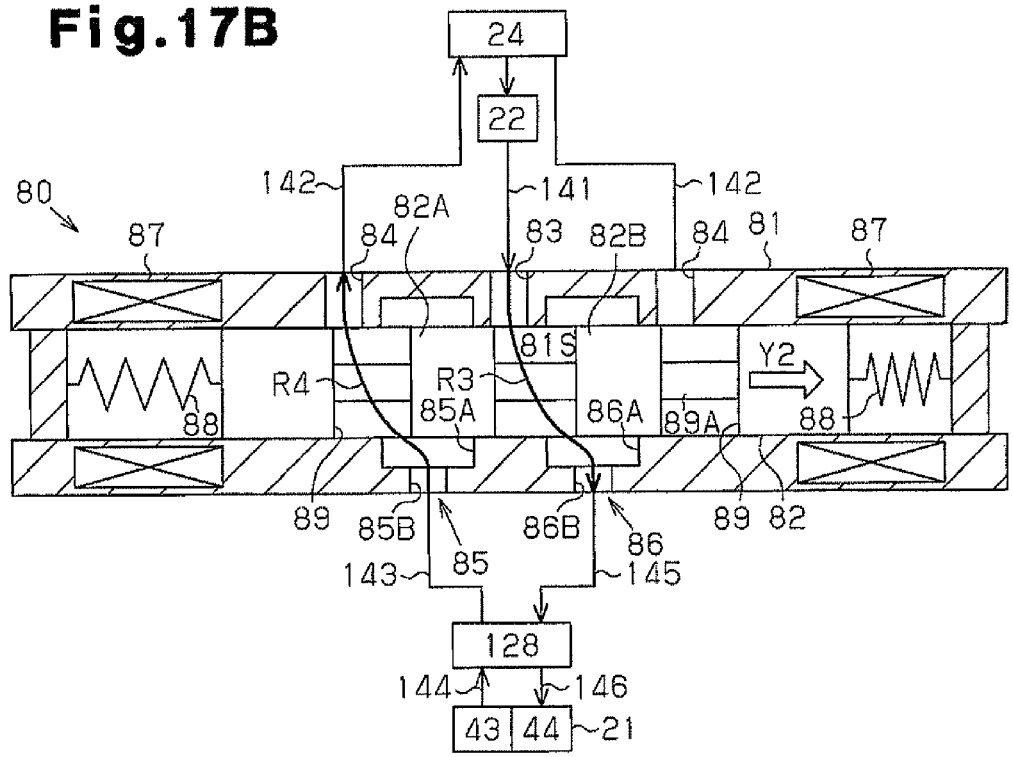
FIG. 17B is a longitudinal cross-sectional view showing a flow control valve at the time when the valve portion is arranged at a second supply position.

Referring to FIG. 17B, when the axial position of the valve portion 82 is the "second supply position", the supply port 83 communicates with the second port 86 and the corresponding drainage port 84 communicates with the first port 85 (the second mode).

Control modes of the control device 150 for the flow control valve 80 will hereafter be described.

The control device 150 selects an operating mode for the flow control valve 80 in correspondence with the manipulating state of the steering wheel 11. Specifically, when the steering wheel 11 is not manipulated, the control device 150 selects the neutral mode as the operating mode of the flow control valve 80. When the steering wheel 11 is turned rightward, the control device 150 selects the first mode as the operating mode of the flow control valve 80. When the steering wheel 11 is turned leftward, the control device 150 selects the second mode as the operating mode of the flow control valve 80.

If the axial position of the valve portion 82 does not coincide with the axial position corresponding to the selected operating mode, or, for example, the first mode is selected when the axial position of the valve portion 82 is the axial neutral position, the electric current value of the coils 87 is changed to move the axial position of the valve portion 82 to the axial position corresponding to the selected operating mode.

The paths of the hydraulic fluid in the flow control valve 80 will hereafter be described. The hydraulic fluid flows along the paths described below on the premise that the operating mode of the bypass valve 128 is set to the basic connection mode.

(A) The hydraulic fluid flows in the paths described below when the flow control valve 80 is in the neutral mode.

With reference to FIG. 16, when the first mode or the second mode is switched to the neutral mode, the axial position of the valve portion 82 is changed from the first or second supply position to the axial neutral position. As a result, the first port 85 and the second port 86 both communicate with the supply port 83 and the drainage ports 84 through the corresponding gaps.

In this state, a small amount of hydraulic fluid is supplied from the supply port 83 to the first port 85 and the second ports 86. Also, a small amount of hydraulic fluid is sent from the first port 85 and the second port 86 to the drainage ports 84. This maintains the hydraulic pressure in the first hydraulic chamber 43 and the second hydraulic chamber 44 in the hydraulic cylinder 21 substantially constant.

(B) The hydraulic fluid flows in the paths described below when the flow control valve 80 is in the first mode.

As illustrated in FIG. 17A, when the neutral mode is switched to the first mode, the valve portion 82 is moved in the direction indicated by arrow Y1. This switches the axial position of the valve portion 82 from the axial neutral position to the first supply position. As a result, the supply port 83 communicates with the first port 85 and the corresponding drainage port 84 communicates with the second port 86.

The hydraulic fluid sent out from the electric pump 22 is supplied to the first hydraulic chamber 43 in the hydraulic cylinder 21 via the fluid supply passage section 141, the supply port 83, the first port 85, the first upstream fluid passage section 143, the bypass valve 128, and the first downstream fluid passage section 144. In the flow control valve 80, as indicated by arrow R1, the hydraulic fluid flows in the order of the supply port 83, an inner space 81S, the first annular groove 85A, and the first communication hole 85B.

The hydraulic fluid in the second hydraulic chamber 44 of the hydraulic cylinder 21 is returned to the reservoir tank 24 via the second downstream fluid passage section 146, the bypass valve 128, the second upstream fluid passage section 145, the second port 86, the corresponding drainage port 84, and the associated fluid drainage passage section 142. In the flow control valve 80, as indicated by arrow R2, the hydraulic fluid flows in the order of the second communication hole 86B, the second annular groove 86A, the inner space 81S, and the corresponding drainage port 84.

(C) The hydraulic fluid flows in the paths described below when the flow control valve 80 is in the second mode.

With reference to FIG. 17B, when the neutral mode is switched to the second mode, the valve portion 82 is moved in the direction indicated by arrow Y2. The axial position of the valve portion 82 is thus changed from the axial neutral position to the second supply position. As a result, the supply port 83 communicates with the second port 86 and the corresponding drainage port 84 communicates with the first port 85.

The hydraulic fluid sent out from the electric pump 22 is supplied to the second hydraulic chamber 44 in the hydraulic cylinder 21 via the fluid supply passage section 141, the supply port 83, the second port 86, the second upstream fluid passage section 145, the bypass valve 128, and the second downstream fluid passage section 146. In the flow control valve 80, as indicated by arrow R3, the hydraulic fluid flows in the order of the supply port 83, the inner space 81S, the second annular groove 86A, and the second communication hole 86B.

The hydraulic fluid in the first hydraulic chamber 43 of the hydraulic cylinder 21 is returned to the reservoir tank 24 via the first downstream fluid passage section 144, the bypass valve 128, the first upstream fluid passage section 143, the first port 85, the corresponding drainage port 84, and the associated fluid drainage passage section 142. In the flow control valve 80, as indicated by arrow R4, the hydraulic fluid flows in the order of the first communication hole 85B, the first annular groove 85A, the inner space 81S, and the corresponding drainage port 84.

The amount of the hydraulic fluid supplied to the hydraulic cylinder 21 is regulated in the manner described below.

With reference to FIG. 16, the control device 150 regulates the amount of the hydraulic fluid supplied to the first hydraulic chamber 43 and the second hydraulic chamber 44 in the hydraulic cylinder 21 by controlling the rotating speed of the electric pump 22 (the electric motor 45) and the open degree of the flow control valve 80. The supply amount of the hydraulic fluid becomes greater as the rotating speed of the electric pump 22 becomes higher and as the open degree of the flow control valve 80 becomes greater.

The flow control valve 80 has four types of open degrees as described below.

(a) A first supply open degree for changing the supply amount of the hydraulic fluid for the first hydraulic chamber 43.

(b) A second supply open degree for changing the supply amount of the hydraulic fluid for the second hydraulic chamber 44.

(c) A first drainage open degree for changing the drainage amount of the hydraulic fluid for the first hydraulic chamber 43.

(d) A second drainage open degree for changing the drainage amount of the hydraulic fluid for the second hydraulic chamber 44.

Specifically, the aforementioned open degrees correspond to the portions of the flow control valve 80 described below.

The first supply open degree corresponds to the communication area of the passage that allows communication between the first annular groove 85A of the first port 85 and the inner space 81S. The second supply open degree corresponds to the communication area of the passage that allows communication between the second annular groove 86A of the second port 86 and the inner space 81S. The first drainage open degree corresponds to the communication area of the passage that allows communication between the first annular groove 85A of the first port 85 and the inner space 81S. The second drainage open degree corresponds to the communication area of the passage that allows communication between the second annular groove 86A of the second port 86 and the inner space 81S.

The content of the assist control will hereafter be described.

In the hydraulic power steering apparatus 100 of the fourth embodiment, the control device 150 executes the "assist selection control" represented in FIG. 12, the "normal-time assist control" represented in FIG. 13, and the "malfunction-time assist control" represented in FIG. 14, as in the assist control of the third embodiment. Specifically, when the malfunction condition is satisfied, indicating that the torque sensor 32 malfunctions, use of an output from the torque sensor 32 is prohibited and the hydraulic pressure in the hydraulic cylinder 21 is controlled using an output of the steering angle sensor 33.

The fourth embodiment thus has the advantages of the third embodiment.

The illustrated embodiments may be modified to the forms described below.

Figure 18:
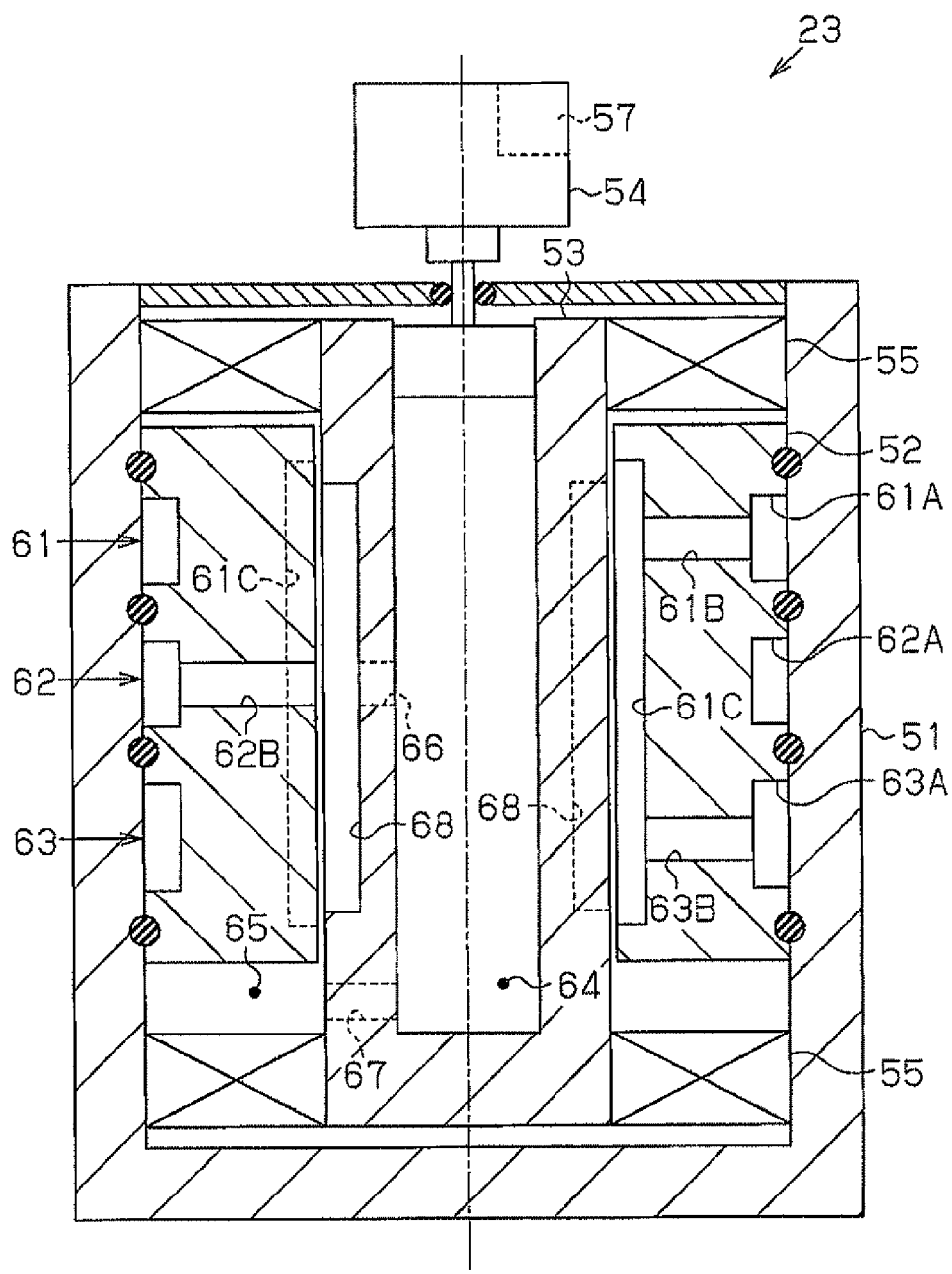
FIG. 18 is a longitudinal cross-sectional view showing a flow control valve mounted in a hydraulic power steering apparatus of another example.

In the first and third embodiments, the torsion bar 56 may be omitted. In this case, as illustrated in FIG. 18, the motor 54 has a sensor 57 for detecting the rotating position of the motor 54. The sensor 57 may be a resolver or a Hall element, which is incorporated in the motor 54. The ECU 31 calculates the rotating direction and the rotating amount, which represent the rotating position, of the motor 54 based on an output signal from the sensor 57. The ECU 31 controls switching between the first mode and the second mode and regulates the open degrees of the first port 61 and the second port 63 using the rotating position of the motor 54.

Figure 19:
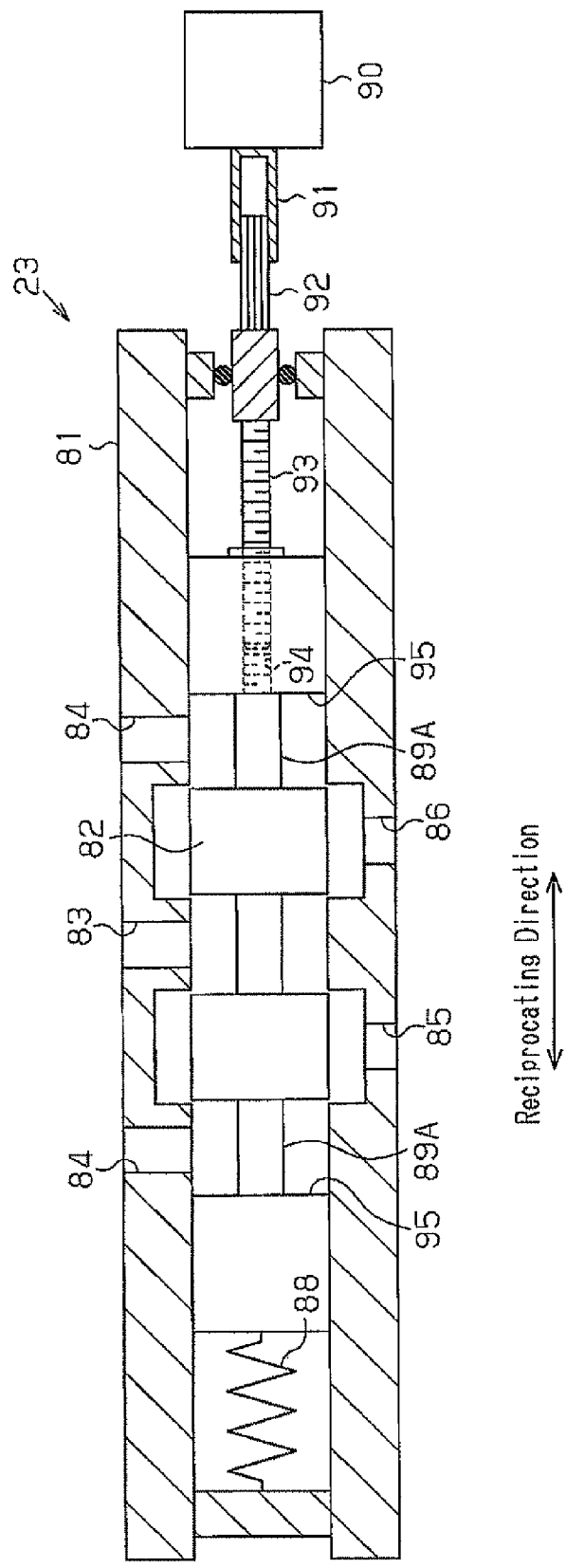
FIG. 19 is a longitudinal cross-sectional view showing a flow control valve mounted in a hydraulic power steering apparatus of another example.

In the second and fourth embodiments, as illustrated in FIG. 19, the coils 87 formed at the two ends of the housing 81 may be replaced by a motor 90, which is arranged at one of the ends of the housing 81, and a mechanism for reciprocating the valve portion 82 by means of the motor 90. Specifically, the joint shafts 89A are attached to the corresponding ends of the valve portion 82. An attachment member 95 is secured to the end of each of the joint shafts 89A opposite to the valve portion 82. A shaft 92 is attached to an output shaft 91 of the motor 90. A threaded portion 93 having an external thread is formed at the distal end of the shaft 92. A threaded hole 94, which becomes meshed with the threaded portion 93 of the shaft 92, is formed in the corresponding one of the attachment members 95. The threaded portion 93 and the threaded hole 94 function as a conversion mechanism for converting rotation of the motor 90 to reciprocal movement.

In the configuration illustrated in FIG. 19, the threaded portion 93 of the shaft 92 is meshed with the threaded hole 94 of the attachment member 95. Accordingly, when the shaft 92 rotates together with the output shaft 91 of the motor 90, the attachment member 95 reciprocates along the axis of the threaded hole 94 and the valve portion 82 reciprocates with the attachment member 95. In this case, the position of the valve portion 82 is detected based on the movement amount of the valve portion 82 with respect to the rotating amount of the motor 90. The rotating amount of the motor 90 is controlled such that the current actual rotating amount of the motor 90 becomes equal to the target rotating amount corresponding to the target position of the valve portion 82. Also, the urging force of the coil spring 88 is applied to the valve portion 82 in the movement direction of the valve portion 82, thus correcting backlash of the valve portion 82.

Further, in this case, the torque acting on the motor 90 and the electric current value of the motor 90 change in correspondence with the elastic force produced by the coil spring 88. Accordingly, the position of the valve portion 82 may be detected and controlled based on the electric current value of the motor 90, instead of the rotating amount of the motor 90. Specifically, the actual electric current value of the motor 90 corresponding to the current position of the valve portion 82 is detected and the target electric current value of the motor 90 corresponding to the target position of the valve portion 82 is calculated. The electric current value of the motor 90 is controlled such that the actual electric current value becomes equal to the target electric current value.

In the second and fourth embodiments, the coil spring 88 may be replaced by a leaf spring. In other words, any suitable elastic member may be employed as long as the elastic member is capable of urging the valve portion 82 in the reciprocating direction.

Figure 20:
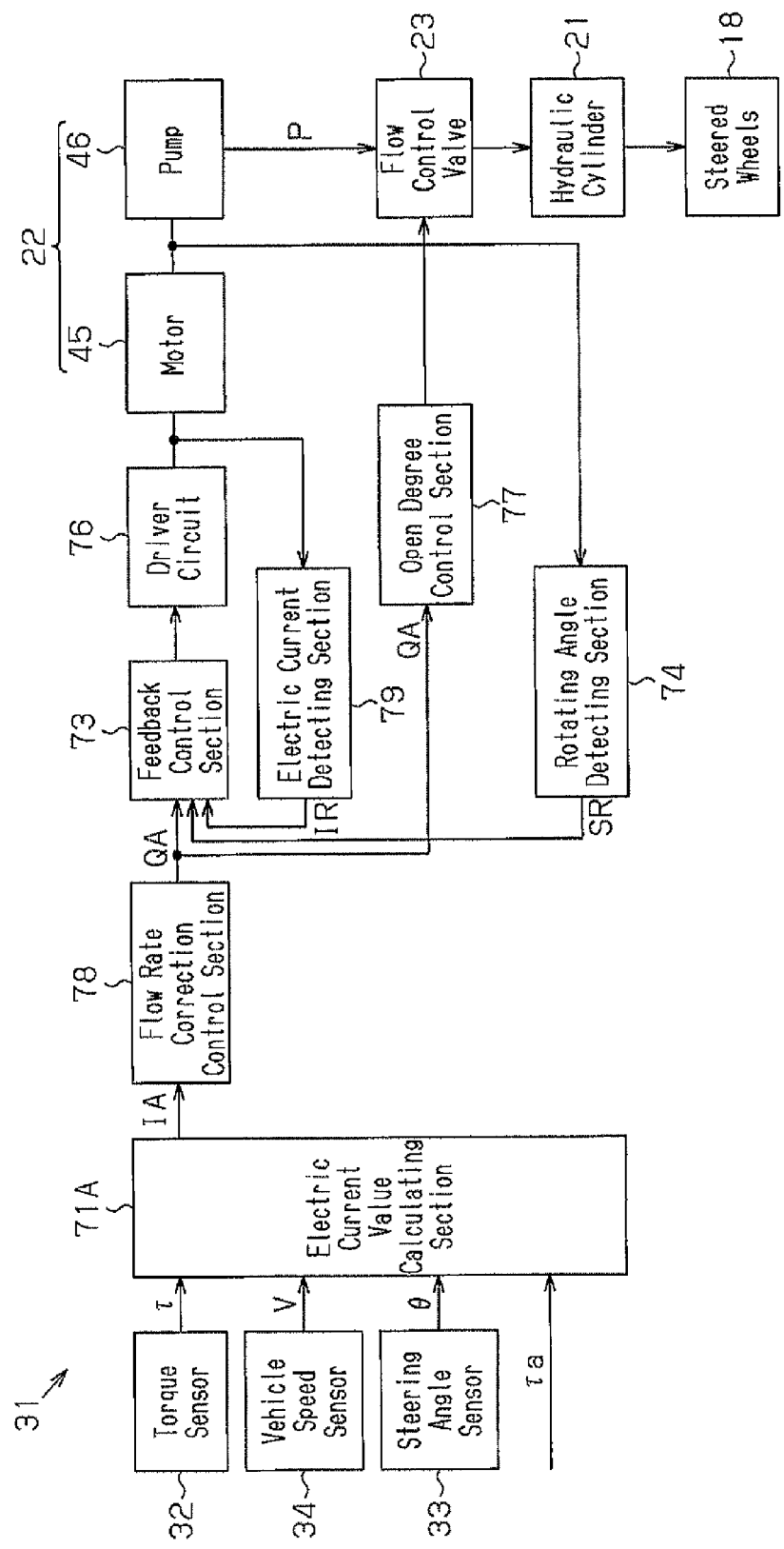
FIG. 20 is a block diagram representing control in a hydraulic power steering apparatus of another example.

In the first and second embodiments, the flow rate Q of the electric pump 22 is controlled using the rotating speed of the electric motor 45 based on the open degree command value TA. However, as illustrated in FIG. 20, the pressure P of the electric pump 22 may be controlled using the electric current value of the electric motor 45. In other words, an electric current value calculating section 71A calculates the electric current command value IA for electric current supply to the electric motor 45 based on the steering torque τ, the steering angle θ, and the vehicle speed V. Then, a flow rate correction control section 78 switches between the first mode and the second mode and calculates the flow rate command value QA based on the electric current command value IA. The flow rate command value QA is a command value for controlling the flow rate of the hydraulic fluid flowing to the hydraulic chambers in the first mode and the second mode. The flow rate command value QA is input from the flow rate correction control section 78 to the feedback control section 73. The feedback control section 73 receives the actual electric current value IR detected by an electric current detecting section 79 and the actual rotating angle SR detected by the rotating angle detecting section 74. The feedback control section 73 generates a motor control signal to be output to the driver circuit 76 based on the flow rate command value QA and feedback electric current control using the actual electric current value IR and the actual rotating angle SR. In this manner, the pressure P of the electric pump 22 is controlled. The flow rate command value QA is input also from the flow rate correction control section 78 to the open degree control section 77. As in the first embodiment, the open degree control section 77 controls the open degree of the flow control valve 23 based on the flow rate command value QA.

In the first and second embodiments, the open degree command value TA is calculated based on the steering torque τ, the steering angle θ, and the vehicle speed V. However, the open degree command value TA may be obtained using either the steering torque τ and the steering angle θ or the steering torque τ and the vehicle speed V. Alternatively, only one of the steering torque τ, the steering angle θ, and the vehicle speed V may be used to determine the open degree command value TA.

In the first and second embodiments, the hydraulic power steering apparatus 1 may have an ECU for controlling the electric pump 22 and an ECU for controlling the flow control valve 23 separately from each other. In this case, the ECUs may be connected together through CAN communication.

In the first and second embodiments, lane deviation preventing control may be performed as traveling assist control, in addition to the parking assist control. For the lane deviation preventing control, a vehicle includes a monitor serving as lane detecting means for detecting a traveling lane on the road surface. In accordance with the lane deviation preventing control, the vehicle is prevented from deviating from the traveling lane through manipulation of the steering wheel based on the information provided by the monitor.

In the lane deviation preventing control, the position of the vehicle with respect to the current traveling lane is detected as the information from the monitor. A torque command value for preventing the vehicle from deviating from the traveling lane is then calculated in correspondence with the detected position of the vehicle. Subsequently, the open degree command value TA is determined based on the torque command value, the vehicle speed V, and the steering torque τ. Then, based on the open degree command value TA, the flow rate Q of the electric pump 22, switching of the hydraulic fluid supply to the hydraulic chambers 43, 44 by the flow control valve 23, and the supply amount of the hydraulic fluid for the selected hydraulic chamber are controlled. This configuration ensures an advantage similar to the advantage (3) of the first embodiment.

In the first to fourth embodiments, the electric pump 22 may be replaced by a pump attached to the engine crankshaft of the vehicle to supply the hydraulic fluid to the hydraulic chambers 43, 44 in the hydraulic cylinder 21.

In the third and fourth embodiments, when the malfunction condition for the torque sensor 32 is not satisfied, the electric pump 22 and the flow control valves 23, 80 are controlled based on outputs from the torque sensor 32, the steering angle sensor 33, and the vehicle speed sensor 34. However, the electric pump 22 and the flow control valves 23, 80 may be controlled based on an output from the torque sensor 32 exclusively.

In the third and fourth embodiments, the fact that the malfunction condition for the steering angle sensor 33 is not satisfied may be added as a condition for executing the "malfunction-time assist control". In other words, the "malfunction-time assist control" may be performed when neither the malfunction condition for the torque sensor 32 nor the malfunction condition for the steering angle sensor 33 are satisfied.

In the "malfunction-time assist control" of the third and fourth embodiments, an output from the vehicle speed sensor 34 may be used to control the hydraulic pressure, in addition to an output from the steering angle sensor 33.

In the third and fourth embodiments, it may be determined whether a malfunction condition indicating that the vehicle speed sensor 34 malfunctions is satisfied. When the malfunction condition is met, an output from the vehicle speed sensor 34 may be prevented from being used to control the hydraulic pressure.

In the third and fourth embodiments, the electric pump 22 may be controlled in a manner modified as described below when the malfunction condition is satisfied. Specifically, the steering speed may be calculated based on a different parameter that changes depending on manipulation of the steering wheel 11. The electric pump 22 is controlled based on the steering speed.

In the third and fourth embodiments, the flow control valves 23, 80 may be controlled in a manner modified as described below when the malfunction condition is satisfied. Specifically, the steering speed may be calculated based on an output from the steering angle sensor 33 and the flow control valves 23, 80 may be controlled based on the steering speed. Alternatively, the steering speed may be obtained using a different parameter and used to control the flow control valves 23, 80.

In the third and fourth embodiments, the communication areas of the fluid passages do not necessarily have to be changed continuously. In other words, each fluid passage may be switched between an open state and the neutral mode.

In the third and fourth embodiments, when the malfunction conditions for the torque sensor 32 and the steering angle sensor 33 are satisfied, the control device 150 may suspend the assist control and set the bypass mode of the bypass valve 128.

The invention claimed is:
1. A hydraulic power steering apparatus for assisting in steering of a vehicle with a hydraulic cylinder, the apparatus comprising:
a flow control valve capable of changing a supply/drainage amount of hydraulic fluid for the hydraulic cylinder;
a detecting device that detects an operating state of a vehicle; and
a control section that sets a supply/drainage mode of the hydraulic fluid for the hydraulic cylinder based on a detection result of the detecting device and that controls the flow control valve in correspondence with the supply/drainage mode, wherein
the interior of the hydraulic cylinder is divided into a first hydraulic chamber and a second hydraulic chamber by a piston formed on a rack shaft,
the flow control valve includes:
a housing, wherein a supply port through which the hydraulic fluid is supplied, a drainage port through which the hydraulic fluid is drained, a first port con- nected to the first hydraulic chamber, and a second port connected to the second hydraulic chamber are formed in an outer peripheral surface of the housing, the ports being arranged at different positions in a circumferential direction of the housing;

a valve portion rotatably received in the housing, the valve portion switching a communication state of each of the ports between a first mode in which the supply port communicates with the first port and the drainage port communicates with the second port and a second mode in which the supply port communicates with the second port and the drainage port communicates with the first port; and a motor that rotates the valve portion about the axis of the housing, and the control section switches between the first mode and the second mode and adjusts a supply/drainage amount of the hydraulic fluid for the first and second ports in the first mode and the second mode by adjusting a rotating amount of the valve portion in correspondence with the supply/drainage mode of the hydraulic fluid.

2. The hydraulic power steering apparatus according to claim 1, wherein the detecting device detects at least one of a steering torque, a steering angle, and a vehicle speed as the operating state of the vehicle.

3. The hydraulic power steering apparatus according to claim 1, wherein
the flow control valve has a sensor that detects a rotating position of the motor, and
the position of the valve portion is controlled based on the rotating position of the motor detected by the sensor.

4. The hydraulic power steering apparatus according to claim 2, wherein the control section sets the supply/drainage mode of the hydraulic fluid based on information corresponding to the relationship between a target parking position and a current vehicle position and the detection result of the operating state of the vehicle, and controls the flow control valve based on the supply/drainage mode such that the vehicle position coincides with the target parking position.

5. The hydraulic power steering apparatus according to claim 2, wherein the control section sets the supply/drainage mode of the hydraulic fluid based on information corresponding to a vehicle position on a traveling lane of a road surface and the detection result of the operating state of the vehicle, and controls the flow control valve based on the supply/drainage mode to prevent the vehicle from deviating from the traveling lane.

6. The hydraulic power steering apparatus according to claim 1, wherein
the flow control valve includes a torsion bar twisted through rotation of the valve portion, and
the torsion bar returns the valve portion to a neutral mode with the ports all not being closed from the first mode or the second mode when the motor is stopped.

7. The hydraulic power steering apparatus according to claim 1, further comprising a torque sensor, the output of which corresponds with a steering torque, wherein
the torques sensor serves as the detecting device,
the hydraulic cylinder changes the level of the hydraulic pressure applied to the hydraulic cylinder in correspondence with the output of the torque sensor, and
when the torque sensor generates an abnormal output, the hydraulic pressure in the hydraulic cylinder is changed in correspondence with a steering speed.

8. A hydraulic power steering apparatus for assisting in steering of a vehicle with a hydraulic cylinder, the apparatus comprising:

a flow control valve capable of changing a supply/drainage amount of hydraulic fluid for the hydraulic cylinder;
a detecting device that detects an operating state of a vehicle; and
a control section that sets a supply/drainage mode of the hydraulic fluid for the hydraulic cylinder based on a detection result of the detecting device and that controls the flow control valve in correspondence with the supply/drainage mode, wherein
the interior of the hydraulic cylinder is divided into a first hydraulic chamber and a second hydraulic chamber by a piston formed on a rack shaft,
the flow control valve includes:
a housing, wherein a supply port through which the hydraulic fluid is supplied, a drainage port through which the hydraulic fluid is drained, a first port connected to the first hydraulic chamber, and a second port connected to the second hydraulic chamber are formed in an outer peripheral surface of the housing, the ports being arranged at different positions in a longitudinal direction of the housing;
a valve portion reciprocally received in the housing, the valve portion switching a communication state of each of the ports between a first mode in which the supply port communicates with the first port and the drainage port communicates with the second port and a second mode in which the supply port communicates with the second port and the drainage port communicates with the first port; and
a drive mechanism that reciprocates the valve portion along the axis of the housing, and
the control section switches between the first mode and the second mode and adjusts a supply/drainage amount of the hydraulic fluid for the first and second ports in the first mode and the second mode by adjusting a movement amount of the valve portion in correspondence with the supply/drainage mode of the hydraulic fluid.

9. The hydraulic power steering apparatus according to claim 8, wherein
the flow control valve includes a conversion mechanism that converts rotation of the motor into reciprocal movement and serves as the drive mechanism and an elastic member that is elastically deformed in correspondence with the movement amount of the valve portion,
the control section detects the position of the valve portion based on an electric current value of the motor and controls the position of the valve portion, and
the motor electric current value is changed by torque acting on the motor in correspondence with elastic force produced by the elastic member.

10. The hydraulic power steering apparatus according to claim 8, wherein
the flow control valve includes a conversion mechanism that converts rotation of the motor into reciprocal movement and serves as the drive mechanism, and
the control section detects the position of the valve portion based on the relationship between the rotating amount of the motor and the movement amount of the valve portion and controls the position of the valve portion based on the rotating amount of the motor.

11. The hydraulic power steering apparatus according to claim 8, wherein
the flow control valve includes an electromagnetic solenoid and an elastic member that urges the valve portion against attractive force produced by the electromagnetic solenoid, the electromagnetic solenoid being arranged at an end of the valve portion and attracting the valve portion through electromagnetic force produced by the electromagnetic solenoid, and the position of the valve portion is controlled by adjusting the electromagnetic force of the electromagnetic solenoid.

12. The hydraulic power steering apparatus according to claim 7, further comprising a steering angle sensor, the output of which changes in correspondence with a steering angle, wherein the steering angle sensor serves as the detecting device, and the hydraulic pressure applied to the hydraulic cylinder is changed in correspondence with the output from the steering angle sensor.

13. The hydraulic power steering apparatus according to claim 12, further comprising an electric pump that supplies hydraulic fluid into the hydraulic cylinder, wherein the rotating speed of an electric motor serving as a drive source of the electric pump is changed in correspondence with the steering speed.

14. The hydraulic power steering apparatus according to claim 13, wherein a piston that divides the interior of the hydraulic cylinder into a first hydraulic chamber and a second hydraulic chamber is mounted in the hydraulic cylinder, the piston is fixed to a rack shaft, a fluid passage connecting the electric pump to the first hydraulic chamber and the second hydraulic chamber is formed between the electric pump and the hydraulic cylinder, the flow control valve is arranged in a middle portion of the fluid passage and adjusts a supply amount of the hydraulic fluid for the first hydraulic chamber and the second hydraulic chamber, the flow control valve includes a housing having a port connected to the fluid passage and a valve portion that is received in the housing and rotates about the axis of the housing, and the supply amount of the hydraulic fluid for the first hydraulic chamber and the second hydraulic chamber is changed in correspondence with the rotating amount of the valve portion relative to the housing, the rotating position of the valve portion being changed in correspondence with the steering speed.

15. The hydraulic power steering apparatus according to claim 14, wherein a fluid supply passage section that connects the electric pump to the control valve, a first fluid passage section that connects the control valve to the first hydraulic chamber, a second fluid passage section that connects the control valve to the second hydraulic chamber, and a fluid drainage passage section that drains the hydraulic fluid from the housing are formed as the fluid passage, a supply port connected to the fluid supply passage section, a first port connected to the first fluid passage section, a second port connected to the second fluid passage section, and a drainage port connected to the fluid drainage passage section are formed as the port, when the position of the valve portion relative to the housing is a first supply position, the supply port and the first port communicate with each other and the drainage port and the second port communicate with each other, and when the position of the valve portion relative to the housing is a second supply position, the drainage port and the first port communicate with each other and the supply port and the second port communicate with each other.

16. The hydraulic power steering apparatus according to claim 13, wherein a piston that divides the interior of the hydraulic cylinder into a first hydraulic chamber and a second hydraulic chamber is mounted in the hydraulic cylinder, the piston is fixed to a rack shaft, a fluid passage connecting the electric pump to the first hydraulic chamber and the second hydraulic chamber is formed between the electric pump and the hydraulic cylinder, the flow control valve is arranged in a middle portion of the fluid passage and adjusts a supply amount of the hydraulic fluid for the first hydraulic chamber and the second hydraulic chamber, the flow control valve includes a housing having a port connected to the fluid passage and a valve portion that is received in the housing and moves in the axial direction of the housing, and the supply amount of the hydraulic fluid for the first hydraulic chamber and the second hydraulic chamber is changed in correspondence with the movement amount of the valve portion relative to the housing, the movement amount of the valve portion being changed in correspondence with the steering speed.

17. The hydraulic power steering apparatus according to claim 16, wherein a fluid supply passage section that connects the electric pump to the control valve, a first fluid passage section that connects the control valve to the first hydraulic chamber, a second fluid passage section that connects the control valve to the second hydraulic chamber, and a fluid drainage passage section that drains the hydraulic fluid from the housing form the fluid passage, a supply port connected to the fluid supply passage section, a first port connected to the first fluid passage section, a second port connected to the second fluid passage section, and a drainage port connected to the fluid drainage passage section form the port, when the position of the valve portion relative to the housing is a first supply position, the supply port and the first port communicate with each other and the drainage port and the second port communicate with each other, and when the position of the valve portion relative to the housing is a second supply position, the drainage port and the first port communicate with each other and the supply port and the second port communicate with each other.

* * * * *